(12) United States Patent
Falacara et al.

(10) Patent No.: US 6,377,263 B1
(45) Date of Patent: *Apr. 23, 2002

(54) INTELLIGENT SOFTWARE COMPONENTS FOR VIRTUAL WORLDS

(75) Inventors: Gary Falacara, Laguna Niguel; Cass Cunningham, Rancho Santa Margarita; Nolan Tamashiro, Irvine; Kevin Alvarado, Lake Forest; Steve Warwick, Cypress; Brad Needham, Costa Mesa, all of CA (US)

(73) Assignee: Aesthetic Solutions, Laguna Niguel, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,562

(22) Filed: Aug. 4, 1997

Related U.S. Application Data

(60) Provisional application No. 60/051,808, filed on Jul. 7, 1997.

(51) Int. Cl.[7] .............................................. G06T 15/70

(52) U.S. Cl. ...................................... 345/473; 345/522

(58) Field of Search ................................. 345/473, 522

(56) References Cited

U.S. PATENT DOCUMENTS

| | | | |
|---|---|---|---|
| 5,584,035 A | * 12/1996 | Duggan et al. | 395/800 |
| 5,651,109 A | * 7/1997 | Glasser et al. | 395/522 |
| 5,873,106 A | * 2/1999 | Joseph | 707/506 |
| 5,877,778 A | * 3/1999 | Dow et al. | 345/474 |
| 5,883,639 A | * 3/1999 | Walton et al. | 345/473 |

FOREIGN PATENT DOCUMENTS

| | | | |
|---|---|---|---|
| GB | 0 583 061 A2 * | 2/1994 | G06T/15/72 |

OTHER PUBLICATIONS

"Superscape Goes Live with World's Fastest 3–D Viewer for the Internet; Virtual Reality Company launches Netscape Plug–In"—Business Wire, Mar. 25, 1996.*

"VRML opens up 3D Worlds in the Web"—Jake Richter in CADalyst, Feb. 1997.*

"The Mac's 3–D edge"—Jim Heid in Macworld, Aug. 1996.*

"Trispectives should be a hit" Terry Wohlers in Computer Graphics World, Nov. 1995.*

(List continued on next page.)

*Primary Examiner*—Mark Zimmerman
*Assistant Examiner*—Mano Padmanabhan
(74) *Attorney, Agent, or Firm*—Knobbe, Martens, Olson & Bear, LLP

(57) ABSTRACT

A system and method for creating a virtual reality is defined. The virtual reality is efficiently constructed by providing a framework, or paradigm, in which the various aspects of the virtual world may be separately constructed, and then brought together at runtime to create the desired virtual reality. The framework includes views, which are windows into a virtual world, virtual worlds which are complete 3D models of the virtual reality, and modular components which are beings (or entities or creatures) that populate the virtual world. The components have both a graphical (visual) model and a behavioral model. The graphical model and behavioral model are independent software modules that may be reused with other components. Included with the modules are attributes, rules, and other parameters that may be used to affect the basic visual appearance and behavior of a component. Components may inherit from other components. The graphical model of a component is constructed from a hierarchy of parts.

20 Claims, 7 Drawing Sheets

OTHER PUBLICATIONS

V–realm Builder Named Top Seller on BuyDirect.com— Business Wire, Feb. 20, 1997.*

Wirfs–Brock et al ("Surveying Current Research in Object Oriented Design"; Sep. 1990, vol. 33, No. 9, Communications of the ACM), Sep. 1990.*

"Information Models, Views, and Controllers: the key to reusability in Smalltalk–80 lines within MVC"; Adele Goldberg, Dr. Dobb's Journal, v15, n7, p54(8), Jul. 1990.*

"Virtual Environments: Reserach in North America" by J. Michael Moshell and Richard Dunn–Roberts, Virtual Reality: An International Directory of Research Projects, Jeremy Thompson Ed., 1993, Chapter 1, pp. 3–26.

"The Inventor Mentor" by Josie Wernecke, Addison–Wesley Publishing Company, Inc., 1994, Chapter 1 pp. 3–20. Chapter 3 pp. 35–77, Chapter 4 pp. 79–90, Chapter 12 pp. 309–325, Appendix A pp. 471–478.

"The VRML 2.0 Handbook" by Jed Hartman and Josie Wernecke, Addison–Wesley Publishing Company, Inc., 1996, Chapter 11 pp. 259–368. Chapter 12 pp. 369–375.

"Sharing Virtual Worlds" by Robert Braham and Richard Comerford, IEEE Spectrum, Mar. 1997, vol. 34, No. 3, pp. 18–51.

"The Future of Virtual Reality: Head Mounted Displays Versus Spatially Immersive Displays" by Steve Bryson; David Zelter; Mark T. Bolas; Bertrand de La Chapelle: and David Bennett, Computer Graphics Proceedings, Annual Conference Series, SIGGRAPH 96, New Orleans, Louisiana, Aug. 4–9, 1996, pp. 485–486.

"Research Frontiers in Virtual Reality" by Frederick P. Brooks, Jr.; Philip Hubard; Randy Pausch; and Andries van Dam, Computer Graphics Proceedings, Annual Conference Series, SIGGRAPH 94, Orlando, Florida, Jul. 24–29 1994, pp. 473–474.

"Interactive Design, Analysis, and Illustration of Assemblies" by Elena Driskill and Elaine Cohen, Department of Computer Science, University of Utah, Salt Lake City, Utah, 1995, pp. 27–33.

"Spatial Representation for Navigation in Animats" by Tony J. Prescott, Adaptive Behavior, vol. 4, No. 2, 1996 pp. 85–123.

"From Complex Environments to Complex Behaviors" by Filippo Menczer and Richard K. Belew, Adaptive Behavior, vol. 4, No. 3/4, 1996, pp. 317–363.

"VR and the Future of the Net" by Bernie Roehl, Virtual Reality Special Report, Mar./Apr. 1996, pp. 16–21.

"Desktop VR: A Progress Report" by Sara Reese Hedberg, Virtual Reality Special Report, Buyer's Guide 1996, pp. 6–10.

Visual Programming Of Program Visualizations A Gestural Interface For Animating Algorithms: by Robert Duisberg, Visual Languages and Applications, pp. 161–173.

"Principles Of Aladdin And Other Alogorithm Animation Systems" by Esa Helttula, Aulikki Hyrskykari, and Kari–Jouko Raiha, Visual Languages and Applications, pp. 175–187.

"Simulacrum: A System Behavior Example Editor" by Dave Bridgeland, Visual Languages and Applications, pp. 191–202.

"Action Graphics A Spreadsheet–Based Language For Animated Simulation" by Charles E. Hughes and J. Michael Moshell, Visual Languages and Applications, pp. 203–235.

"Animation Using Behavior Functions" by Timothy C. Lethbridge and Colin Ware, Visual Languages and Applications, pp. 237–252.

"Modeling For Virtual Reality" by Diana Phillips Mahoney, Computer Graphics World, Oct. 1995, pp. 45–50.

"3D Worlds On The Web" by John R. Vacca, Computer Graphics World, May 1996, pp. 43–50.

"Virtual Reality On The PC" by Diana Phillips Mahoney, Computer Graphics World, May 1996, pp. 53–60.

"Simulating Humans" by Norman I. Badler; Cary B. Phillips; and Bonnie Lynn Webber, Oxford University Press, 1993, pp. 1–270.

"Virtual Reality—Through the new looking glass" by Ken Pimentel and Kevin Teixeira, Windcrest McGraw–Hill, 1993, pp. 64–142.

* cited by examiner

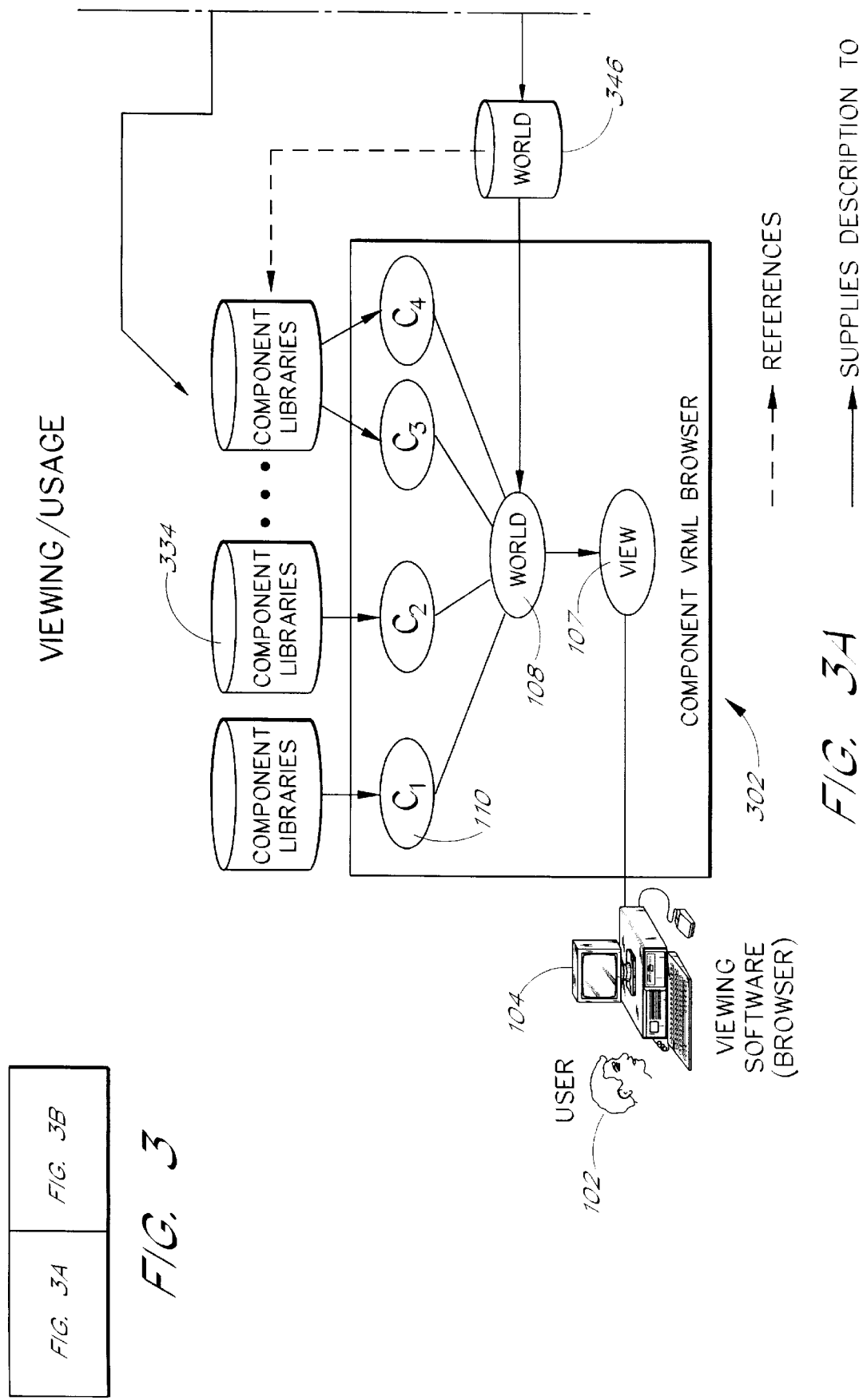

INTELLIGENT SOFTWARE COMPONENTS FOR VIRTUAL WORLDS

REFERENCE TO PRIOR RELATED APPLICATION

This application claims priority from a U.S. Provisional Patent Application No. 60/051,808 filed Jul. 7, 1997 and entitled "INTELLIGENT SOFTWARE COMPONENTS FOR VIRTUAL WORLDS."

BACKGROUND OF THE INVENTION

1. Field of the Invention

The present invention relates to three-dimensional modeling software and more particularly to software for creating and viewing virtual realities.

2. Background

A major goal of computer graphics has long been to create a realistic world on a computer screen. In 1965, Ivan Sutherland suggested that the ultimate computer display would make the picture look and sound real and the objects act real. Sutherland's goals are today embodied in the concept of Virtual Reality (VR). VR generally encompasses more than just a 3D image. The concept of a virtual reality envisions a computer generated display, often accompanied by sound, which is immersive and interactive. In a true virtual reality, the user is immersed in the virtual world. The user "enters" the virtual world displayed on the computer screen, and explores that world as he or she would explore part of the real world. Each user can chart a different course through the virtual world and interact with various objects in the virtual world. An interactive virtual world allows the user to interact with the virtual world in various ways, such as bumping into walls, opening doors, moving objects, etc. Every virtual world is, at its lowest level, nothing more than a computer model which is described in a modeling language such as the Virtual Reality Modeling Language (VRML). The computer model usually includes a mathematical model which describes the size, shape, and location of various objects and light sources in the virtual world. The computer model often also includes various graphics resources such as bitmaps, textures, etc., which are used provide a sense of life (reality) to the otherwise sterile mathematical models. Together, the mathematical models and the graphics resources are used by a computer software program to generate a realistic display. VRML provides a grammar for describing the various aspects of the computer model needed to create a virtual world. VRML provides a method for describing a world that meets two of Sutherland's three requirements for a virtual reality, namely the look real and sound real requirements.

VRML grew out of a brainstorming session at the May 1994 World Wide Web (Web) conference in Geneva Switzerland. Several researchers had been working on a virtual reality interface for the Web that would allow Web browsers to display 3D images and, hopefully, virtual worlds. The result of the Geneva session was a commitment to develop a scene description language that could be used in conjunction with the Web. The first VRML draft specification, VRML 1.0, was unveiled in October 1994. By the fall of 1995, several VRML viewers (known as browsers) and a Web authoring tool that provided the ability to interactively place objects in scenes were available. Also in the fall of 1995, the VRML Architecture Group (VAG) met to discuss the next version of VRML. During early 1996, the VRML community considered a number of proposals and by August 1996, VRML 2.0 was largely finalized.

VRML is not a programming language like C++ or JAVA. VRML is a modeling language which is used to describe 3D worlds, and VRML provides a relatively efficient format for describing simple and complex 3D objects and worlds. The description of a virtual world contained in a VRML file is brought to life by a software program known as a VRML browser. The VRML browser generates a computer display of the virtual world described by a VRML file. VRML browsers also provide capabilities to allow a user to change viewpoints, to walk or fly through the virtual world, and to interact with the virtual world.

VRML 1.0 provided static worlds. With VRML 1.0, the user could travel through the virtual world, but interactions, such as opening a door, were not provided. In VRML 2.0, objects in the virtual world can move and can respond to both time-based and user-initiated events. For example, VRML 2.0 provides proximity sensors that open doors or turn on lights when a user is near the sensor. VRML 2.0 also allows the incorporation of multimedia objects such as sound and movies into the virtual world. Moreover, VRML 2.0 provides simple animations, scripting (the calling of functions written in true programming languages), and prototypes (essentially subroutines written in VRML).

In VRML, the fundamental element of construction is the node. VRML provides nodes to specify shapes such as boxes, cones cylinders, extrusions, etc. VRML provides a appearance node to specify color, position, texture, etc. Nodes can "contain" other nodes. For example, VRML provides a group node which contains a list of nodes as a logical group. The All of the nodes in a VRML file are collected in a hierarchy known as a scene graph (similar to the way in which files often are collected in a directory hierarchy).

Although VRML files are text files that can be created and edited using a text editor, it is generally easier to use a modeling editor to generate the VRML files. Modeling editors provide graphical modeling capabilities, much like a CAD (Computer Aided Design) program. VRML modeling editors are provided by the Caligari Corp., Integrated Data Systems, Kinetix, Paragraph International, Radiance Software International (VRML 1.0 only), Sense8, Silicon Graphics, Virtus Corp, and VREAM. Many of the these companies also provide VRML browsers. VRML browsers are also provided by Chaco Communications, Intervista, Netscape, Microsoft, and others.

VRML 2.0 provides some capabilities for motion and interaction, and thus VRML 2.0 worlds are interactive to a limited extent. For example, by using scripting nodes, VRML provides support for scripted, but not compiled, behaviors (e.g., motions, reactions). Scripting nodes can be inserted at various places in the scene graph, but they are not intrinsically bound to any other content other than through their placement within the scene graph or through explicit reference to fields in other nodes. There is no direct support for inheritance, compiled behaviors, rules that govern behaviors, or dependency information. These behavioral concepts must be added to the language using new constructs.

VRML is largely a geometry description language that is used to describe a 3D scene. VRML 2.0 provides no notion of the separation of content, i.e., the separation of graphical models from behavior models. Thus, VRML 2.0 provides no mechanism for generating a behavior model (e.g., stop, walk, run) that can be used with different graphical models (e.g., dog, cat, human). The concept of a modular software component (or creature) which has a graphical model and a separate behavior model does not exist in VRML. The concept of such a component which has some measure of autonomy is even more foreign to VRML. As a result, it is very difficult to generate dynamic, living, virtual worlds in which various objects move through the world (e.g., people moving in a building) in a manner which simulates real life.

SUMMARY OF THE INVENTION

One aspect of the present invention is a system and method that allows a living (dynamic) virtual reality environment to be quickly and efficiently constructed by providing a framework, or paradigm, in which the various aspects of the virtual world may be separately constructed, and then brought together to create the desired virtual reality. The framework includes views, which are windows into a virtual world, virtual worlds which are complete 3D models of the virtual reality, and modular components which are beings (or entities or creatures) that populate the virtual world. The components have both a graphical model and a behavioral model. The process of creating a virtual world is similar to the way in which a motion picture is made. In this case, the components are the actors and props, the world is the set, and the view is the presentation medium. There is an important difference, of course, in that VR applications are by definition interactive and allow the audience to interact with and control character and prop behavior. Nevertheless, the development processes used are very similar and reflect a conscious effort to devise an approach that is powerful, and flexible and yet intuitive and easy to master.

One aspect of the present invention is a method for creating the components, behaviors, worlds, and other constituents necessary for a virtual reality. The method comprises four steps as follows:

1. Create raw 3D content including models and textures.
2. Create the component which incorporates the 3D models and textures from step 1 and adds parts, attributes, behaviors, rules, and dependencies.
3. Create the world using components to generate individually configurable objects. Configure each component by establishing its initial state in terms of position, orientation, size, attribute values, automatically activated behaviors, and response scenarios (i.e., how behaviors and attributes changes in response to events). Add lights and paths as needed and configure environmental parameters.
4. Create a view in which I/O devices are configured, scripts are written for controlling objects and mapping I/O actions into events, and a console is inserted for monitoring and controlling the world.

Step 1 may be accomplished using commercially available modeling and graphics editors to generate content. Step 2 is accomplished using a component development kit in accordance with one aspect of the present invention. Step 3 is accomplished using a world development kit in accordance with one aspect of the present invention. Step 4 is accomplished using a view development toolkit in accordance with one aspect of the present invention. Views, as supported by the invention herein, are not presently supported by a VRML 2.0 compliant browser.

A further aspect of the present invention is a computer graphics system for creating a computer display of a virtual world and for allowing a user to manipulate the display and the actors in the virtual world through the use of various input devices. The display is created by an enhanced VRML browser. The browser loads a description of the virtual world, and loads VR components from a component library. The VR components have separate visual and behavioral models, and the browser loads these models as well. The browser also loads a description of a view into the virtual world and uses this description to generate the displayed image. The browser accepts user inputs from input devices and then manipulates the displayed VR components in response to the inputs. The browser uses the behavior models to provide interactions between the various displayed components and the virtual world. The browser may also produce sounds on a speaker attached to the display computer.

A further aspect of the invention is a modular computer graphics system for creating a visual representation of a virtual reality by using a computer processor, a visual display device, and one or more VR software components. The VR components each have a reference to a visual model and a reference to a behavior model. The models may be stored in a database. The graphics system may further include a world software module which contains references to the VR components. The world may also include definition of an initial state for each referenced component. Definitions of an initial state may include an initial position, an initial orientation, an initial size, an initial set of attribute values, and/or an initial set of automatically activated behaviors for each referenced component. The world definition may also include specifications for one or more virtual light sources, paths, and environmental parameters. The modular computer graphics system may also include a definition of a view that references the virtual world. The view may have scripts for controlling the VR components and the view may provide a way to interact with computer input/output (I/O) devices. The view can map I/O actions into events in the virtual world. The view may also group a set of VR components into a console to monitor and control the virtual world.

A further aspect of the invention is method for creating a virtual reality having modular software creatures, each creature having separable visual and behavioral aspects. The method includes the steps of: loading an enhanced VRML browser; loading a description of a virtual world; loading one or more VR components referenced by the virtual world; loading behavior and visual models referenced by the software components; and generating a view of the virtual world on a computer display device. The browser uses the behavior models to provide interactions between the VR components and between the VR components and the virtual world. The method allows for hidden (invisible) components, including components that have no geometry nodes.

The visual models, and the behavior models, and the components may be stored in libraries. The browser may use information in the definition of the virtual world to establish an initial state for each VR component instantiated in the virtual world. The initial state for each component may include an initial position, an initial orientation, an initial size, an initial set of attribute values, and an initial set of automatically activated behaviors. The browser may also initialize light sources, paths, and environmental parameters. The browser also may use a definition of a view to create a view into the virtual world. The view may provide the capability to: run scripts; access to input/output (I/O) devices; map I/O actions into events in the virtual world; and use a console to monitoring and control the virtual world.

In yet another embodiment, the invention includes a modular computer graphics system for creating a visual representation of a virtual world, using VR software components. Visual aspects of the VR components may be constructed from a hierarchy of parts, where each part may have a logical name. Behaviors may be connected to the various parts by using the name of a behavior, and the logical name of a part. The parts may be described using a VRML-like syntax. An enhanced VRML browser loads the virtual world, components, parts, and behaviors and produces a visual image on a display screen. The behaviors may use rules which govern the relationships between different behaviors. Rules may include exclusivity between different behaviors, a hierarchy among different behaviors, and definitions of precedence among behaviors. The VR components may also include attributes.

Another aspect of the invention is a software component which describes a virtual reality creature. The description includes a reference to a visual model and a reference to a behavior model. The description may also include one or more parts. The description may also include logical names for one or more aspects of the visual model or the parts and logical connections between the logical names and the behavioral model. Additionally, the description may include fields to specify attributes and additional references to one or more additional behavior models. The parts may be arranged in a hierarchical structure.

A further aspect of the invention is a programming construct for defining a component. The component construct may optionally include: a geometry field for referencing a visual model; a behavior field for referencing a behavior model; a name field for specifying a name for the component; a signature field for specifying a unique ID for a component that can be used to differentiate different components having the same name; a version field for specifying a version identifier; an inheritance field for specifying a parent component; an attributes field for specifying one or more attributes; a rules field for specifying a list of one or more rules for said component; and a subcomponents field listing of one or more subcomponents.

Yet another aspect of the invention is a programming construct for defining a behavior. The behavior construct may optionally include fields used to specify; references to software modules that implement the behavior; references to an initialization module; reference to an action module; references to a finish module; a localname; a variable for activating the behavior; events that trigger the behavior; and any dependencies.

Another aspect of the invention is a software construct for specifying a behavioral dependency, including fields to specify the type of dependency, and a name field that references an element that controls the dependency. Dependency types include part dependencies, attribute dependencies, and event dependencies.

Another aspect of the invention is a method for providing a console in a virtual reality browser. The method includes the steps of defining user controls, a camera for peering into a virtual world, and the attaching of the controls to the camera such that the controls move with the camera. The controls may be output controls to provide the user with information and input controls to allow the user to manipulate the virtual world. The controls may be virtual reality components, each component having a visual model and a behavioral model. The console itself may be a virtual reality component having a visual model and a behavioral model.

A further aspect of the invention is a programming construct to provide a logical connection between a user input device and a resulting action by a virtual reality browser. The construct includes a reference to a type of user input device; a reference to an action on the input device that will trigger an event message; and a destination for the event message.

Yet another aspect of the invention is a VRML construct to provide a logical connection between an action at an input device and sending an event to a VRML node. The logical connection includes: a reference to a user input device; a reference to an action on the input device; and a node to receive an event notice when the specified action occurs. The input device may be a keyboard, mouse, or any other type of input device.

BRIEF DESCRIPTION OF THE FIGURES

FIG. 3A shows how the browser uses the components and worlds to generate the virtual reality display for the user.

DETAILED DESCRIPTION OF THE PREFERRED EMBODIMENTS

The detailed description that follows is presented in two major sections. The first section describes the central concepts, processes, and terminology associated with the component VR paradigm. The second section describes a particular implementation of the VR component technology using extensions to the Virtual Reality Modeling Language (VRML).

VR Component Paradigm

Figure 1:
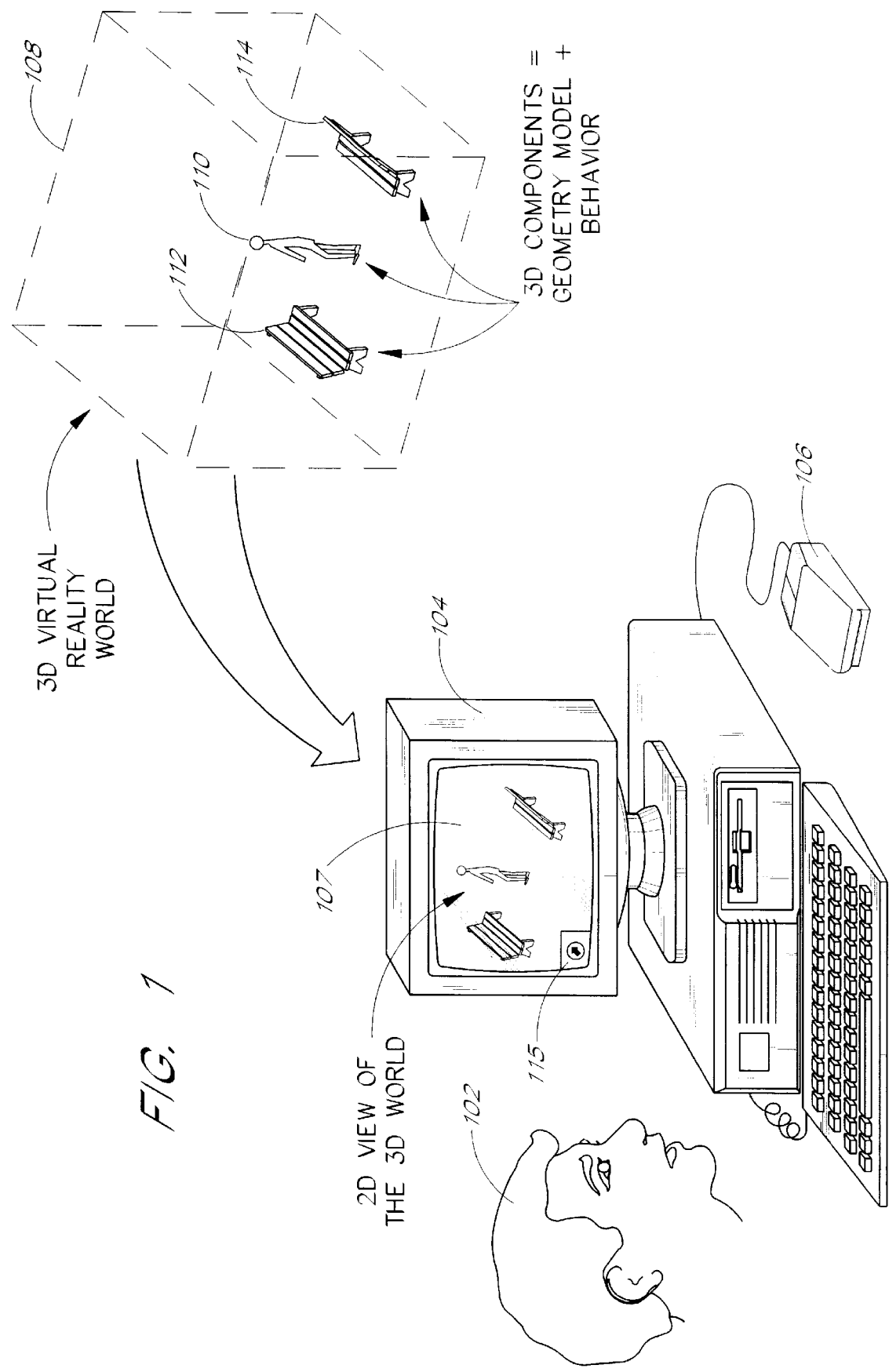
FIG. 1 illustrates an architecture of a virtual reality (VR) system that uses modular virtual reality software components as actors in the virtual world.

The VR component paradigm incorporates a model that employs three central concepts: (1) Components; (2) Worlds; and (3) Views. FIG. 1 is a high level drawing that illustrates the architecture of a virtual reality (VR) world 108 that uses modular virtual reality software components 110, 112 and 114 as actors in the virtual world 108. The three-dimensional VR world 108 "exists" as a mathematical model that is manipulated by VR rendering software, known as a browser, running on a computer system 104. The browser produces a two-dimensional view 107 of the three-dimensional world 108 and displays this view on a screen of the computer system 104. A user 102 uses input devices 106 (e.g., a keyboard and a mouse) to interact with the browser and thereby manipulate the view 107 and interact with the components 110. The view 107 may also display components such as a fuel gauge 115. In describing virtual reality components in the discussion that follows, the component 110 will be used as an example for any component (including but not limited the components 112, 114, and 115). Each component 110 has a geometry model that describes the visual aspects of the component and each component 110 has a behavior model that describes the behavior, or actions, of the components 110. The components 110 are autonomous in that each component 110 has its own independent behavior model that describes how the component 110 reacts with other components 110, with structures in the VR world 108, and with the user 102. Thus, even in the absence of inputs by the user 102, the components 110 are capable of moving throughout the world 108 and interacting with other components 110.

The definition of the component 110 carries with it a complete specification of the appearance, composition, and personality for a creature, character, machine, etc. The appearance is specified by a combination of 3D models and textures. The appearance models and textures can be imported from various Commercial-Off-The-Shelf (COTS) tools including 3D modelers and bit-mapped image editors in a variety of formats, such as, for example, VRML, DXF, VRML 2.0, and Inventor. The composition of a component 110 is specified by two additional ingredients known as "parts" and "attributes".

Figure 6:
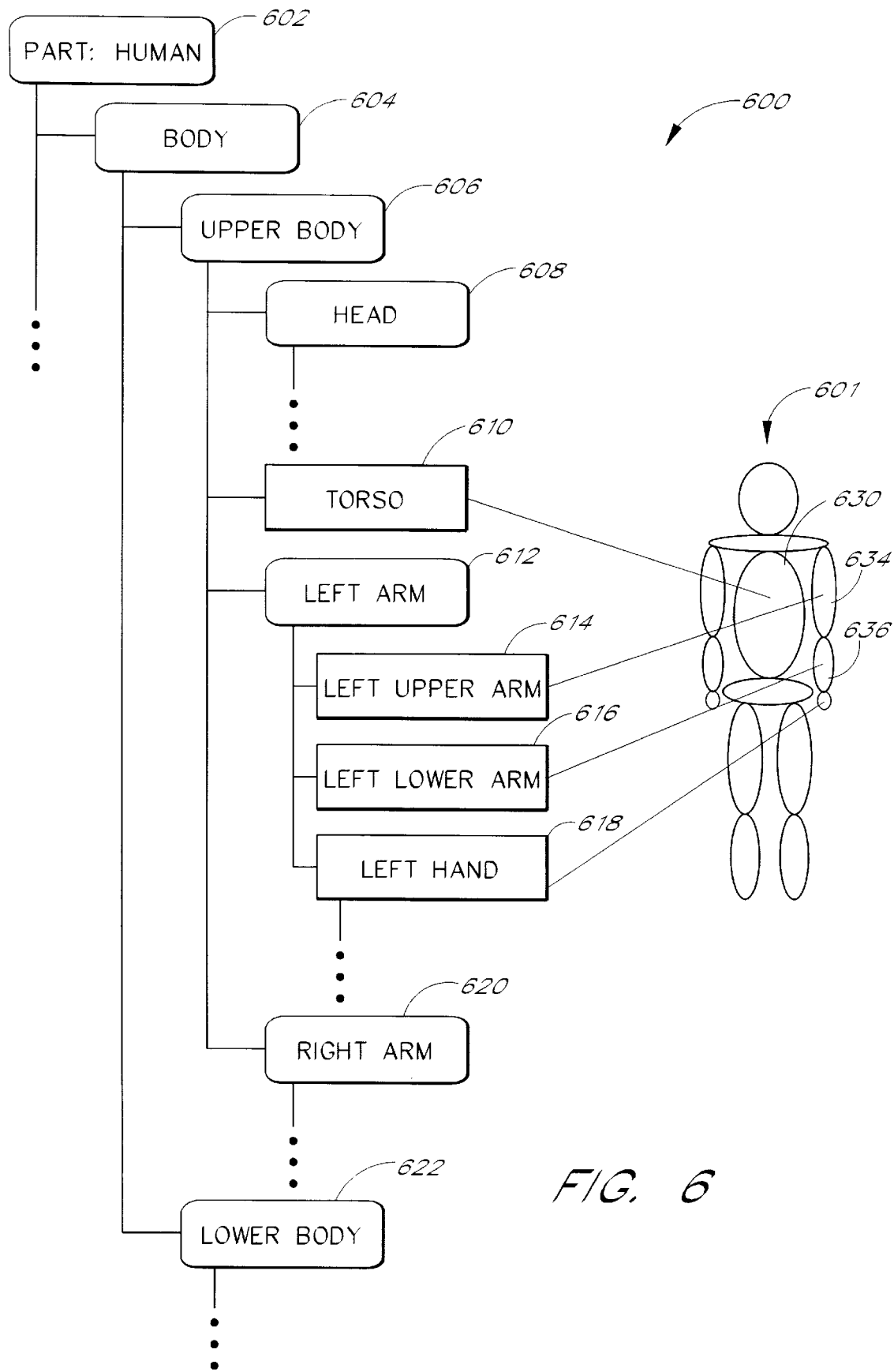
FIG. 6 illustrates a sample part hierarchy for a "human" component.

Parts are essentially logical names for the elements within a geometrical model of a component 110. Parts are organized into a hierarchy that can be used by other aspects of the component 110 such as its behaviors. A sample (partial) part hierarchy for a human component is shown in FIG. 6 described below. The ramifications of having a part hierarchy are twofold. First, it allows certain sets of parts to be manipulated as a whole (e.g., the right and left arms in FIG. 6 include upper and lower arms as well as hands which might in turn include fingers). Second, the hierarchy separates the actual physical appearance, dictated by the geometry model, from the logical organization of the component 110 used by the behavior mode. Thus, two components 110 might both be human, but one may have muscular green arms and the other might have slender red arms. In both cases, the components 110 are human and the behaviors that move the arms will work, regardless of the actual physical structure of each arm.

Attributes are used to store non-geometric information about the abstract or physical properties of a component. Examples of attributes include weight, maximum speed, and aggressiveness. Each attribute has an associated value that can be varied for each individual object derived from the same component. For example, given a single baseball player component with speed and power attributes, it is possible to create many different player objects using the baseball player component by setting the speed and power attributes for each object separately. Thus, an entire team of nine players, in which no two players are the same, can be created using the single baseball player component.

Behaviors define the actions and reactions of a component 110. Behaviors define what a component 110 can do but not what a component 110 will do. What a component 110 will do is determined when a world 108 is defined and the behavior of each component 110 is scheduled, activated, or bound to an event in the world 108. Thus, while a human component 110 is capable of walking, jumping, and running, this does not imply that each object created from the human component 110 will always walk, jump, and run. These behaviors must be triggered or otherwise controlled by the environment or the user when the world 108 is running. Behaviors are also governed by rules and dependencies.

Dependencies are used by component and world authoring tools to determine the compatibility of a behavior with a given component 110. For example, a component 110 with no legs cannot walk. Behaviors can be written in many forms including compiled C code, compiled C++ code, Java, Java Script, animation sequences, and scripting languages, and therefor are not limited by the capabilities of VRML.

Rules establish relationships between behaviors that are enforced whenever components 110 are placed into a world 108 and used. As an example, consider the relationship between a walking and running behavior. Obviously, a component 110 should not be able to do both simultaneously. In such a case, a rule might be established that indicates that walking and running are mutually exclusive. In other cases, one behavior might automatically trigger another behavior (e.g., a shooting behavior in a tank might automatically trigger a recoil behavior). There are many different kinds of rules available and fairly complex logic for ensuring the integrity of rules.

One additional characteristic of components that is not shown in FIG. 1 is that they can be created through inheritance. Using inheritance, a new component can be created by selecting an existing component, and simply adding to it or overriding its geometry, attributes, behavior, etc. Using the examples above, a baseball player component could be created from a basic human component by adding parts such as a fielders glove or a bat and by adding behaviors such as catching, throwing, and hitting. The existing parts, attributes, and behaviors in the human component would be available to baseball player components, but not vice versa because the baseball player component is considered the "child" or derivative of the human component. Moreover, as parts, attributes, and behaviors are added to the human component, they become available to the baseball player component through inheritance.

The world 108 is the framework within which components are used to create applications. The world 108 typically contains static objects (e.g., buildings, fences, furniture, etc.) and components. In a preferred embodiment, the world 108 is populated with components by using drag-and-drop tools that fetch components 110 from a file-based repository or from a database. The components 110 can be used to create a variety of objects, each of which can be individually configured. The world designer can: set the position, size, and orientation for each component 110; set the attribute values for each component 110; and configure the behavior of each component 110. In addition to static objects and components 110, the world 108 contains, lights and paths. As the name implies, lights are entities that emit light into the world 108 and enable the user 102 to see the world and its content. Lights can be named, positioned, and configured. Configuration options for lights include intensity, position, direction, color, and attenuation. Paths are collections of 3D points that can be used for navigation by the user 102 or a component 110. Each path point contains a position and orientation, and the points are placed into the path in the order in which they are to be visited when the path is being followed. Finally, there are environmental parameters that can be set in the world including background (i.e., sky) coloring, fog effects, and ambient light.

To re-emphasize the motion picture analogy, the process of world building is very much like the process of positioning characters and props on a stage, setting up the lighting and special effects, and instructing the characters what to do when the camera starts rolling. In this case, the camera starts rolling when the world 108 is executed in the browser. Thus, worlds, like components, are essentially definitions and contain directions that dictate, at least initially, how the world is going to unfold once it starts running. If the user 102 begins interacting with the world 108 and/or the components (e.g., 110, 112, 114) begin interacting with one another, the pre-programmed aspects of the world start to break down and the overall behavior becomes less predictable and less repeatable. This is the nature of interactive technologies and one of the key reasons why such technologies are particularly well suited in applications such as gaming and training.

The view 107, as shown on the display 104, is a rendering of the world 108 and a specification of how the user 102 is interacting with the world 108. Views can be passive if the user 102 simply wishes to watch or attach himself/herself to a component 110 and witness the world 108. The view 107 can be interactive if the user 102 wishes to control or trigger the behavior objects using the computer Input/Output (I/O) devices 106. The devices 106 supported by the view 107 include traditional I/O devices such as a keyboard and mouse but support for more exotic devices such as a spaceball, a 3D mouse, a data glove, or a head mounted display is also provided. The view 107 provides a facility for writing viewer scripts. A viewer script is a very high level statement of command and control that can be used to specify or constrain the kinds of things the user 102 or the components 110 can do. For example, a viewer script may turn on a specified object's behavior for a fixed amount of time and then disable it. As another example, a script may state that a certain behavior will be turned on when a certain event is detected (e.g., a collision). Viewer scripts can also be used to map the actions of the devices 106 into various control activities such as the setting of an attribute value or the activation of a behavior. An important facet of the view 107 is that it is specified separately from the world 108. A single view 107 can therefore be used to interact with more than one world 108. Should the view 107 request control over a component 110 that does not exist in a given world 108, the request is simply ignored, thus providing for a great deal of flexibility and reuse.

The view 107 provides a facility for creating a console. The console is a collection of objects that stay in front of the user 102 as he/she is viewing the world 108 and that can be used to manipulate and/or monitor components 110 in the world 108. The console can contain components 110, but unlike components 110 created and inserted into the world itself, the world 108 has no notion that a console component 110 exists because the console component is merely a part of the user interface. An example of a console component might be a fuel gauge, a virtual joystick for navigation, or a logo.

Figure 2:
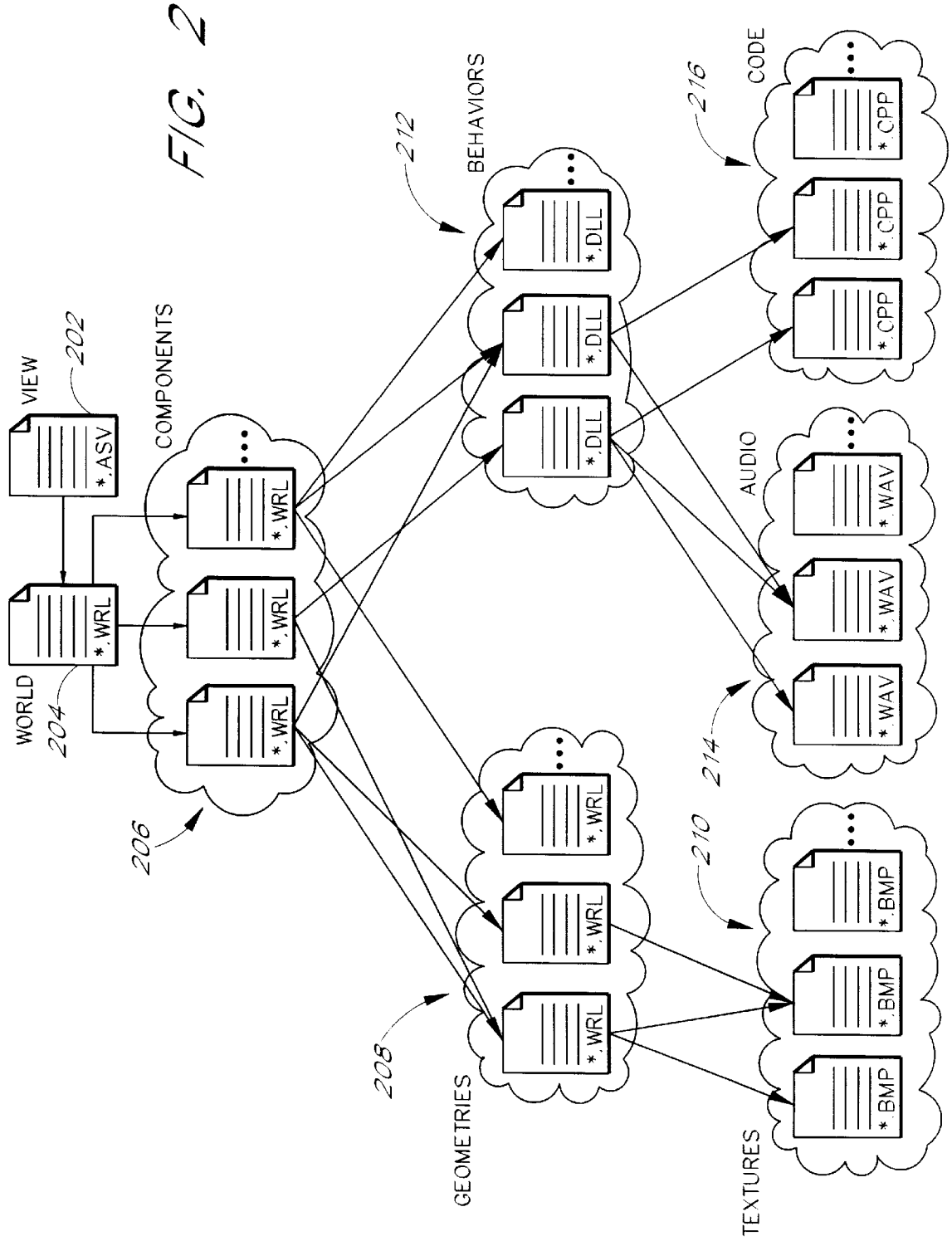
FIG. 2 illustrates, at the file level, the relationship between the various items that define a virtual reality using VR components.

FIG. 2 illustrates, at the file level, the relationship between the various items discussed above. FIG. 2 shows a view file 202 which references a world file 204. The view file 202 contains all of the information needed by the browser to construct the view 107. The view file may reference one or more world files 204, but typically the view 107 will only display one world 108 at a time. The world file 204 is a file (such as a VRML 2.0 file *.wrl) which contains a description of the world 108. The world file 204 references one or more component files 206. Each component file 206 is a file (such as a VRML 2.0 file *.wrl) which contains a description of a component 110. The component files 206 may reference geometry files 208 and behavior libraries 212. The geometry files 206 may be VRML files (*.wrl) that contain additional geometry information needed to render the components 110. The behavior libraries 212 are program files (e.g., Dynamic Link Libraries (*.dll) files, JAVA, JAVA Script, etc.) that contain code to implement various behaviors (e.g., walk, run) for the component 110. Component behavior libraries 212 are created from one or more source code files 216. Each behavior file 212 may also reference one or more audio files 214. Each geometry file 208 may reference one or more textures 210. The textures 210 are files (e.g., *.bmp, *.jpg, etc.) that contain images, such as wallpapers, that are used to add texture and realism to the components 110 when they are rendered.

Figure 3B:
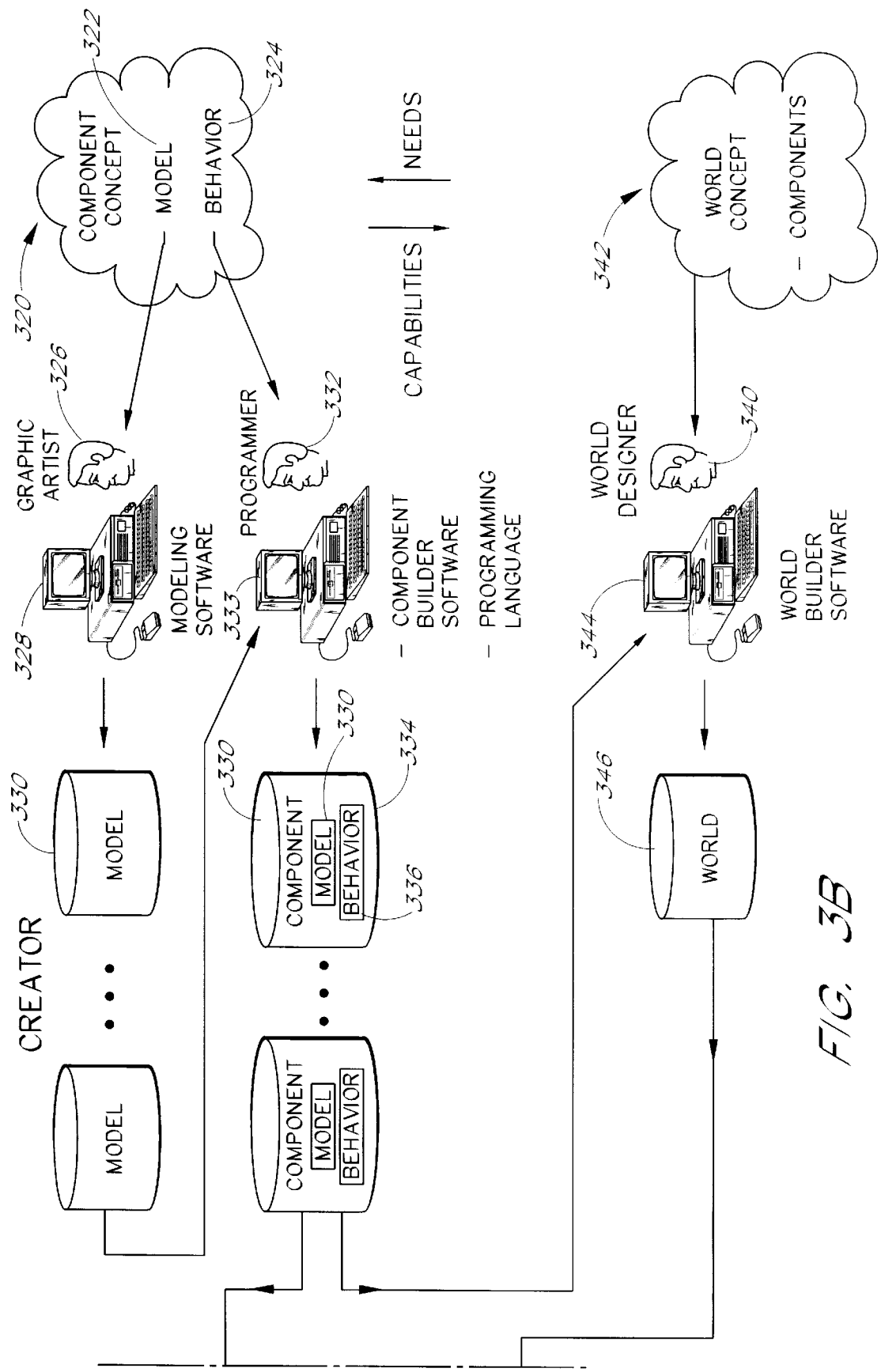
FIG. 3B shows the process of creating the world and component libraries.

FIGS. 3A and 3B illustrate an overall system architecture showing the process of creating a virtual reality from an initial world concept 342 and for an initial component concepts 320 to the user 102. FIG. 3B shows the process of creating the world and component libraries. FIG. 3A shows how the user 102 uses the components 110 and worlds 108 to experience the virtual reality. The process begins with an initial world concept 342 which is driven, in whole or in part, by the capabilities of the available components. The world concept 342 may also create a need for additional new components. The new components are manifest in the form of a component concept 320 which includes a model concept 322 and a behavior concept 324. A graphic artist 326 takes the model concept 322 and, using a modeling software program 328, generates a geometry library 330. Using a component builder software program 333, a programmer 332 takes the behavior concept 324 and the geometry library 330 and generates a component library 334. Each component in the library 334 is described by a component file 206 (FIG. 2.) and thus each component in the library 334 has a component model 330 and a component behavior 336. Each component model 330 references one or more geometry files 208 (FIG. 2.) and the component behavior references one or more behavior libraries 212 (FIG. 2). The component libraries 334 are supplied to the world designer 340. The world designer 340 uses a world builder software program 344 to generate a world library 346. The world library 346 contains world files 204 (FIG. 2.).

The user 102 wishing to view (in the view 107) a world 108 from the world library 346 must first gain access to the world library 346 and the component libraries 334. The user 102 can obtain these libraries by any means used to transfer computer files, including the internet or a CD-ROM. To create the view 107, The user 102 uses the computer system 104 to run a component VRML browser 302. The browser 302 loads the world 108 from the world library 346 and the necessary components 110 from the component libraries 334, and a description of the view 107 from a view file 202. The browser 302 then creates the view 107 and displays the world 108 in the view 107.

One aspect of the present invention is a method for creating the components 110, behaviors, worlds 108, and other constituents necessary for a virtual reality as shown in FIG. 3. The method comprises four steps as follows:

1. Create raw 3D content including models and textures.
2. Create the component 110 which incorporates the 3D models and textures from step 1 and adds parts, attributes, behaviors, rules, and dependencies.
3. Create the world 108 using components to generate individually configurable objects. Configure each component by establishing its initial state in terms of position, orientation, size, attribute values, automatically activated behaviors, and response scenarios (i.e., how behaviors and attributes changes in response to events). Add lights and paths as needed and configure environmental parameters.
4. Create a view 107 in which I/O devices are configured, scripts are written for controlling objects and mapping I/O actions into events, and a console is inserted for monitoring and controlling the world.

Step 1 may be accomplished using commercially available modeling and graphics editors to generate content. Step 2 is accomplished using a component development kit in accordance with one aspect of the present invention. Step 3 is accomplished using a world development kit in accordance with one aspect of the present invention. Step 4 is accomplished using a view development toolkit in accordance with one aspect of the present invention.

This method has many advantages. First, it promotes a high degree of reuse that would otherwise not be feasible, particularly if one were simply managing content at the lowest common denominator of VRML. Second, the approach herein achieves significant efficiencies in terms of Web download time because the components 110 can be distributed separately from the worlds 108. Once a reasonable set of components has been obtained, either via the World Wide Web or CD-ROM, then a relatively small world definition can be downloaded with the components loaded off the user's local disk. Web download time has been a significant barrier to wider adoption of VR over the Web, and the ability to load components from the user's disk significantly reduces the amount of information that must be downloaded. Third, the approach herein operates at a significantly higher level than any of the prior art tools. The existing tools simply provide a graphical interface for directly creating and manipulating VRML nodes in a single scene graph. With the component VR paradigm, the user is never exposed to any VRML concepts and works strictly with high level, conceptual ingredients such as component, attributes, behaviors, rules, paths, etc.

Figure 4:
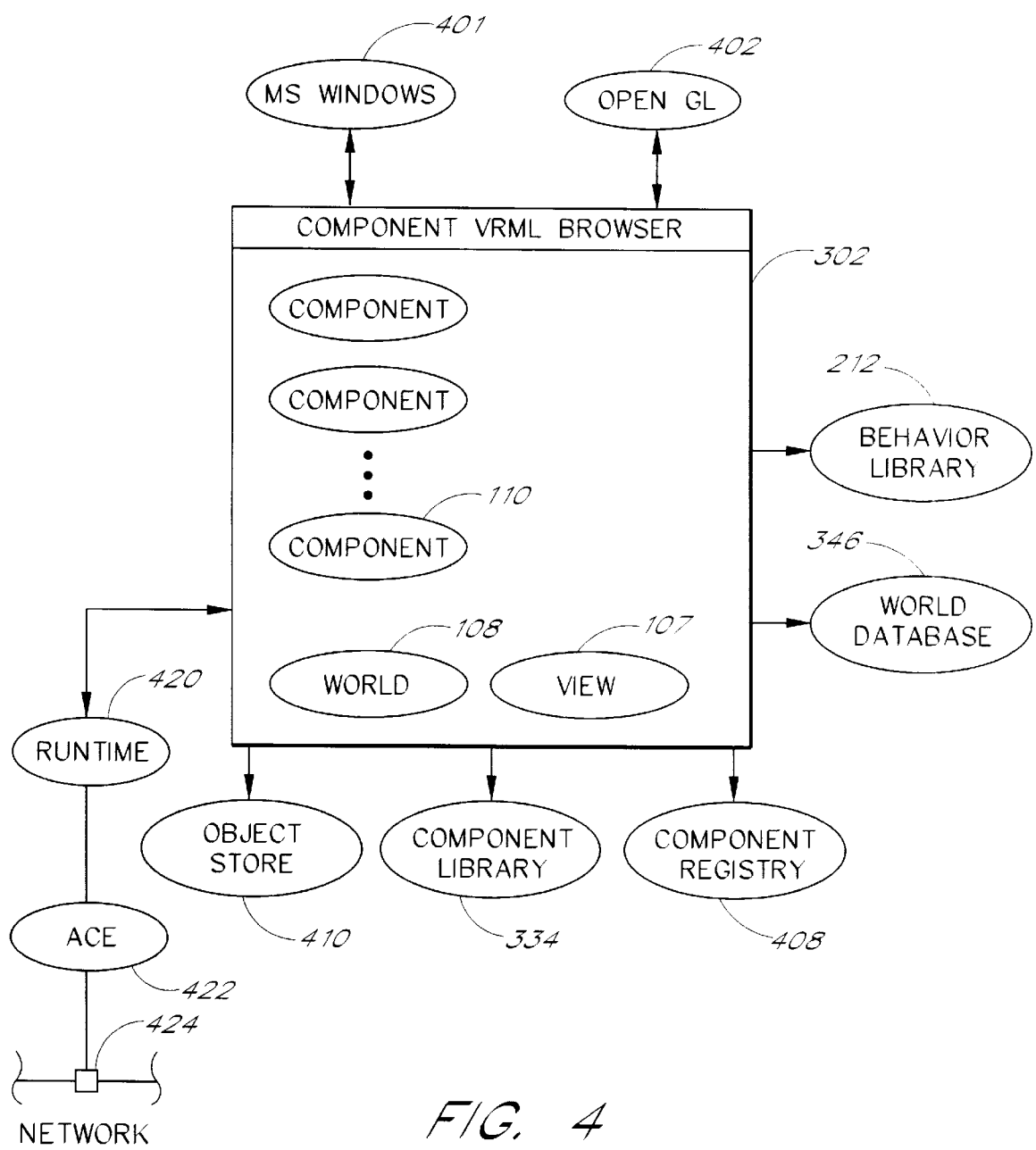
FIG. 4 illustrates the software libraries and data files used by the browser during execution.

The browser 302 performs many functions, but its primary task is interpreting VRML files and generating a display in the view 107. FIG. 4 illustrates the software libraries and data files used by the browser 302 during execution. The browser 302 is typically an application level program that runs on an operating system 401 such as Microsoft Windows. The browser 302 typically does not do the actual 3D rendering, but rather calls a rendering library 402 such as OpenGL to generate the graphics on the computer screen. The browser 302 translates modeling code (e.g., VRML code) into calls to the rendering library 402. The browser loads the behavior libraries 212 (as needed) and the world descriptions 204 from the world database 346. The browser 302 accesses a component registry 408 to find the components 110 and then loads the components 110 from the component libraries 334. The browser 302 may also communicate with a network 424 to retrieve other component and world libraries and to communicate with other browsers. In a preferred embodiment, the browser 302 communicates with the network 424 using an ACE protocol 422 and an ACE runtime library 420.

Figure 5:
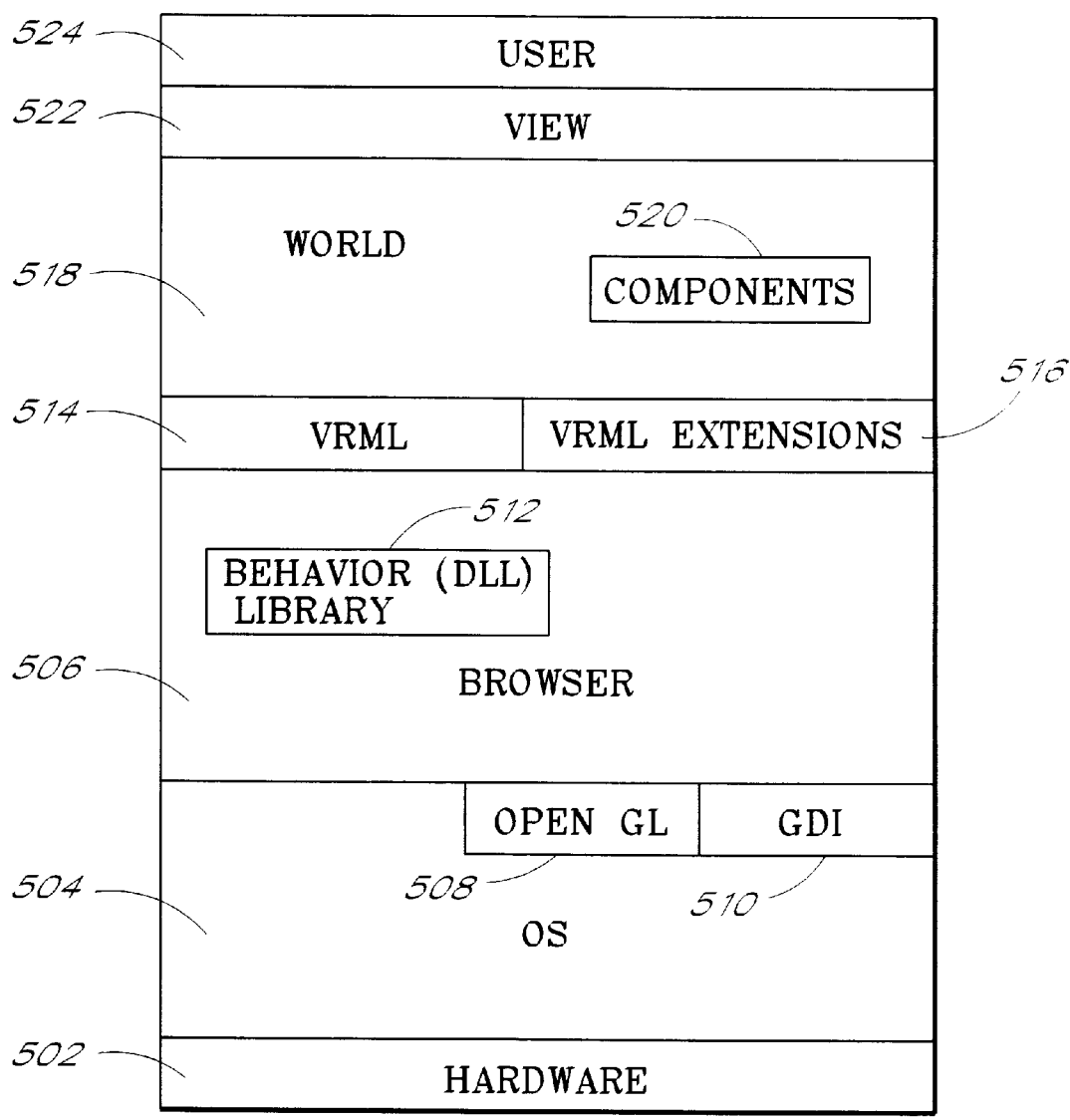
FIG. 5 illustrates a conceptual hierarchy of the software layers that exist between in the virtual reality system.

FIG. 5 illustrates a conceptual hierarchy of the software layers that exist between the user 102 and the computer system 104. At the lowest level of the hierarchy, the computer system 104 and the input devices 106 are represented by a hardware layer 502. An operating system layer 504 runs on the hardware layer 502. The browser 302 runs in an application layer 506 on top of the operating system layer 502. The operating system 502 provides a 3D rendering application programming interface (API) 508 (e.g., OpenGL) and a graphics device interface (GDI) 510 to the browser layer 506. A behavior module 512 runs inside the browser layer 512. The browser layer 506 presents a VRML interface 514 and an extended VRML interface 516 to the world layer 518 above. A component module 520 is contained inside the world layer 518. The view 107 exists in a view layer 522 which sits on top of the world layer 518. The user 102 is represented by a user layer 524 which sits on the view layer 522.

One skilled in the art will recognized that the hierarchy illustrated in FIG. 5 is similar to a network protocol stack in that it illustrates how the upper layers communicate with the layers below. Thus, for example, the user 102, represented by the user layer 524 "talks" to the world 108, represented by the world layer 518 through the view 107 represented by the view layer 522. Likewise, the world layer 518 communicates with the browser through one of the intervening VRML layers 514 and 516.

As stated previously, the components 110 are constructed from parts, which are similar to the VRML concept of nodes in a scene graph. Parts are organized into a hierarchy that can be used by other aspects of the component such as its behaviors. FIG. 6 shows a partial part hierarchy 600 for a human component (human) and a stylized rendering 601 of the human component. The hierarchy 600 is shown as a tree structure wherein non-terminal nodes (grouping nodes in VRML parlance) are drawn with rounded corners and terminal nodes are drawn with square corners. The hierarchy 600 begins at a root node 602 which defines the part name. A body node 604 is a child of the root node 602. The body node 604 has two child nodes, an upper body node 606 and a lower body node 622. A head node 608 is a child of the upper body node 606. A torso node 610 is a terminal child node of the upper body node 606. A left arm node 612 is a child of the upper body node 606. A left upper arm node 614 and a lower left arm node 616 are terminal child nodes of the left arm node 612. A left hand node 618 is a child of the left arm node 612.

The VRML Embodiment

The VR component paradigm can be implement using VRML, with extensions, and code libraries to provide the behaviors. VRML is nothing more than a file format for storing the specification of an interactive 3D application in a form known as a scene graph. Thus, VRML provides, to a large degree, the machinery needed to describe the component 110, the world 108, and the view 107 in the same way that a programming language, such as C++, provides the machinery needed to write computer programs. Extensions to VRML are desirable because VRML provides no method for inheritance, compiled behaviors, rules, or dependency information. The VR component paradigm, together with the VRML extensions, provides content that VRML has no direct way of representing and thereby promotes a process of development that VRML alone does not envision.

Almost all VRML worlds contain 3D models and other low level content such as textures and audio clips. The model (e.g., non-behavioral) aspects of the components 110 may be described using standard VRML and may be stored in VRML format. Moreover, individual 3D model elements, referred to as nodes in VRML parlance, can be labeled and organized into a hierarchy, in much the same way that parts are used to label and organize 3D model elements within a component 110. However, VRML has no intrinsic notion of maintaining a logical part hierarchy separate from the 3D models as is done in the definition of a component 110. Using inheritance and the separation of part hierarchy from the 3D model allows the creation of different components 110 that have identical part hierarchies, but vastly different 3D content.

In terms of attributes, VRML supports a construct known as a field node which allows the creation of attribute-like values. A VRML construct called a proto node is similar to a subroutine definition. The proto node acts as a template for a set of fields that can be used to create a set of values that can be inserted into various other places within the scene graph. Thus, at a rudimentary level, VRML provides basic building blocks that can be adapted to store component-like attributes, and the present invention uses these building blocks to provide an underlying description mechanism.

In terms of behaviors, VRML provides support for scripted, but not compiled, behaviors using the VRML scripting nodes. Scripting nodes can be inserted at various places in the scene graph but they are not intrinsically bound to any other content other than through their placement within the scene graph. Support for behavior in VRML is very primitive and limited to a fixed application programming interface (API). VRML provides no direct support for inheritance, compiled behaviors, rules, or dependency information. The component notion of behavior is far more sophisticated on many levels. Many desirable behavioral concepts are not supported by VRML. These behavioral concepts must be added to the language using new constructs.

In terms of the world 108 and the view 107, VRML has no notion of the separation of content other than the use of the VRML constructs called inlines and anchors. Inlines are references to other VRML files that are literally copied in place at the point of reference. There are no limits or constraints that dictate the content of an inline. It is a very low level feature akin to the use of an #include statement in C or C++. An anchor is also a reference to another VRML (or HTML) file, but the anchor is associated with a node, and when that node is selected, the existing scene graph is flushed and completed replaced by the referenced file. Again, this is a low level mechanism for linking files and has no bearing on content. These low level mechanisms contrast sharply with the VR component paradigm notions of worlds 108 and views 107 in which content management, not file management, is the governing principle. The content of the component 110, the world 108, and the view 107 are vastly different, although related. More importantly, the separation of content in this way promotes the maximum degree of reuse. Components 110 can be used in different worlds 108, and worlds 108 can be associated with different views 107. In terms of the content supported directly by VRML, there is no direct support for devices, user interfacing scripts, paths, or consoles as there are in worlds and views.

As important as some of the aforementioned content differences are, a further fundamental and important class of differences have to do with the processes supported by the VR component paradigm and its derivative tools. In this context, VRML is nothing more than a low level language that is used to create more complex applications in much the same way that C, C++, and Java are used. Using this analogy, one aspect of the present invention is a compiler that generates VRML code.

The BenchWorld Example

Many aspects of the present invention are readily illustrated through the example world 108 shown in FIG. 1 wherein a single component 110 is placed between two benches 112, 114. In the world 108, the component 110 is an example component called blockman. When instantiated into the world 108 the blockman component 110 is given the name "theHuman" (each instantiation is given a unique name because a component can be instantiated many times in a given world 108). The component 110 theHuman walks in a straight line and when he bumps into a bench 112 or 114, he turns around and heads in the opposite direction. Thus, with the two benches 112, 114 in the world 108, theHuman 110 will pace back and forth, continuously colliding with each bench and reversing direction each time he collides.

The files for the world 108 are shown in Tables 1–4. The lines of each file are numbered so that the file contents of each file may be readily explained in the text that follows. Although the contents of these file are in VRML 2.0 syntax, a standard VRML browser will not recognize some of the nodes used in the files. In particular, the nodes beginning with "AS" and the WorldInfo node are extensions to standard VRML 2.0. A compatibility file, listed in Appendix B, provides protoypes for these non-standard nodes. Using the information in Appendix B, the files herein can be read by a standard VRML browser without creating an error. However, for a standard browser, the definitions in Appendix B are merely stubs. Even with the compatibility file, a standard browser will not provide the extra functionality described by the non-standard nodes because it does not recognize the new nodes as being special. An enhanced VRML browser, which does recognize the special nodes described in Appendix B, is used to fully use the information in the example files below.

The World File

The world definition file 208 is listed in Table 1 below.

TABLE 1

World file for the example of FIG. 1.

```
1   #VRML V2.0 utf8 #Aesthetic Solutions World
2
3   WorldInfo {
4       title    "BenchWorld"
5       info     "version 1.0"
6   }
7
8   Viewpoint {
9       position    0 0 1000
10  }
11
12  EXTERNPROTO blockman[
13      field           SFFloat       speed
14      field           SFBool        reverseOnCollisionsActive
15      field           SFBool        runActive
16      field           SFBool        walkActive
17      exposedField    SFVec3f       translation
18      exposedField    SFRotation    rotation
19      exposedField    SFVec3f       scale
20      exposedField    SFRotation    scaleOrientation
21      exposedField    SFVec3f       center
22      exposedField    MFNode        children
23      eventIn         SFFloat       tick
24  ]   [ "blockman.wrl#blockman" ]
25
26  EXTERNPROTO bench[
27      field           SFBool        isHit
28      field           SFBool        shakeWhenHitActive
29      exposedField    SFVec3f       translation
30      exposedField    SFRotation    rotation
31      exposedField    SFVec3f       scale
32      exposedField    SFRotation    scaleOrientation
33      exposedField    SFVec3f       center
34      exposedField    MFNode        children
35      eventIn         SFFloat       tick
36  ]   [ "bench.wrl#bench" ]
37
38  Background {
39      groundColor   0 1 0
40      skycolor      0 0 0
41  }
42
43  Transform {
44      translation   0 0 0
45      scale         1 1 1
46      children [
47          DEF theHuman blockman{
48              speed                       2000.0
49              reverseOnCollisionsActive   TRUE
50              runActive                   FALSE
51              walkActive                  TRUE
52          }
53      ]
54  }
55
56  Transform {
57      translation   -200 0 0
58      scale         1    1 1
59      children [
60          DEF bench1 bench{
61              isHit           FALSE
62              shakeWhenHit    TRUE
63          }
64      ]
```

TABLE 1-continued

World file for the example of FIG. 1.

```
65      }
66
67   Transform {
68        translation  200 0 0
69        scale         1  1 1
70        children [
71           DEF bench2 bench{
72              isHit          FALSE
73              shakeWhenHit   TRUE
74           }
75        ]
76   }
```

Table 1, Line 1 contains both a standard heading for a VRML 2.0 file (#VRML V2.0 utf8), which is required for compatibility with the VRML 2.0 standard, and an additional heading (#Aesthetic Solutions World) which is used to identify the file as a world file 204. A information node, WorldInfo, is contained in lines 3–6. The WorldInfo node contains information used to specify the name and version associated with the world 108. Lines 12–24 contain what is known as an EXTERNPROTO in VRML 2.0 parlance. An EXTERNPROTO is essentially an interface specification. This particular EXTERNPROTO specifies the interface to a "blockman" component, which is used to create the human 110. The last line of the "blockman" EXTERNPROTO (line 24) indicates where the actual blockman component specification can be found (e.g., in a component definition file 206). In this case, the specification is contained in the "blockman.wrl" file under the label "blockman." Each component has a unique EXTERNPROTO that is generated when the component is constructed. The interface contains a field for each component attribute (of various data types) and a boolean field for activating each behavior. In the example shown in Table 1, the reverseOnCollisionsActive field for theHuman object is set to TRUE, the runActive field is set to FALSE, and the walkActive field is set to TRUE. Thus, when the world starts executing, theHuman object will automatically activate the walk and reverseAfterCollisions behaviors, but will not activate the run behavior. Similarly, both bench1 and bench2 will activate the shakeWhenHit behavior because the shakeWhenHit field for each bench is set to TRUE. Note that it is the responsibility of the tools used to build worlds to maintain consistency between the EXTERNPROTO nodes in world files and the PROTO nodes (i.e., where the component implementation is actually contained) found in the corresponding component files.

Following the EXTERNPROTO for blockman is an EXTERNPROTO for a bench in lines 26–36. Lines 38–41 describe a background node that specifies the background colors to be used by a VRML browser when the world is played. Following this, on lines 43 through the end of the file, is the actual world specification in which objects are instantiated from the components listed in the EXTERNPROTO nodes. Each object instantiation is wrapped in a transform node (lines 43, 56, and 67) that determines where the object will be placed in the world, how big the object will be, and which way the object will be oriented. The actual instantiation of the components occurs on lines 47, 60, and 71. On line 47, a human component 110, "theHuman", is instantiated from the component "blockman" whose EXTERNPROTO was specified starting on line 12. Similarly, two separate bench objects known as "bench1" and "bench2" are instantiated on lines 60 and 71 from the same component "bench" whose EXTERNPROTO is specified starting on line 26.

Table 2 lists a component file 206 for the blockman component. This file is considerably more complex than the world file and contains a combination of EXTERNPROTO nodes and built-in PROTO nodes that are implicitly understood by the extended VRML browser. Line 1 contains the standard VRML standard header and a VR component header used to identify this as a component file (#Aesthetic Solutions Component). Lines 3–6 contain a WorldInfo Node, although in this case this is the name of the component and its version rather than the name of a world. There can alternatively be optional signature information in the info field. This signature information can be used to differentiable components, even those having the same name.

TABLE 2

A component definition file for the "blockman" component.

```
1   #VRML V2.0 utf8 #Aesthetic Solutions Component
2
3   WorldInfo {
4       title   "blockman.arl"
5       info    "version 1.0"
6   }
7
8   EXTERNPROTO reverseAfterCollisions[
9       field SFBool     active
10      field SFString   name
11  ]   "behaviors.arl# reverseAfterCollisions "
12
13  EXTERNPROTO run[
14      field SFBool     active
15      field SFString   name
16  ]   "behaviors.arl#run"
17
18  EXTERNPROTO walk[
19  field SFBool     active
20  field SFString   name
21  ]   "behaviors.arl#walk"
22
23  PROTO blockman[
24      field SFFloat  speed 1.5
25      field SFBool   reverseOnCollisionsActive FALSE
26      field SFBool   runActive FALSE
27      field SFBool   walkActive FALSE
28      exposedField SFVec3f     translation  0 0 0
29      exposedField SFRotation  rotation     0 0 1 0
30      exposedField SFVec3f     scale        1 1 1
31      exposedField SFRotation  scaleOrientation 0 0 1 0
32      exposedField SFVec3f     center       0 0 0
33      exposedField MFNode      chiidren     [ ]
34      eventIn      SFFloat     tick
35  ]
36  {
37      ASComponent {
38          geometry  ASGeometry { url "blockman_geo.wrl" }
39          name      "blockman"
40          signature " "
41          version   "1.0"
42          inheritance "human"
43          attributes [
44              ASAttribute {
45                  name  "speed"
46                  type  "float"
47                  value IS shakeOffset
48              }
49              ASAttribute {
50                  name  "reverseOnCollisionsActive"
51                  type  "bool"
52                  value IS reverseOnCollisionsActive
53              }
54              ASAttribute {
55                  name  "runActive"
56                  type  "bool"
57                  value IS runActive
58              }
```

TABLE 2-continued

A component definition file for the "blockman" component.

```
59          ASAttribute {
60              name     "walkActive"
61              type     "bool"
62              value IS walkActive
63          }
64      ]
65      behaviors [
66          reverseOnCollisions {
67              name     "reverseOnCollisions"
68              activate IS reverseOnCollisionsActive
69          }
70          run {
71              name     "run"
72              activate IS runActive
73          }
74          reverseOnCollisions {
75              name     "reverseOnCollisions"
76              activate IS reverseOnCollisionsActive
77          }
78      ]
79      rules [
80          ASRule {
81              source   "walk"
82              target   "run"
83              type     "excludes"
84          }
85      ]
86      subcomponents [
87      ]
88  }
89 }
```

Lines 8 through 21 contain EXTERNPROTO nodes for the behaviors used by this component. Again these EXTERNPROTO nodes are interfaces and the actual specification of the behaviors is contained in the behaviors.arl file under the names designated on lines 11, 16, and 21. Thus, the reverseAfterCollisions behavior definition can be found in the behaviors.arl file under the name "reverseAfterCollisions" and so forth. The definition for the component blockman begins on line 23. Lines 24–27 repeat the interface contained in the EXTERNPROTO used in world files such as that found on lines 12–24 in the world file shown in Table 1. One difference is that in the actual PROTO for the component, each field has a default value shown to the far right in lines 24 through 33. The eventIn on line 34, is a means by which a clock tick can be passed to the component for use in its behaviors. Following the interface specification, and starting with the "{" on line 36, is the implementation specification for the blockman component. This implementation is based on a built in node type known as ASComponent. This node includes geometry (line 38), a name (line 39), a signature (line 40), a version string (line 41), inheritance information (line 42), attributes (lines 43–64), behaviors (lines 65–78), rules (lines 79–85), and subcomponents (lines 86–87).

The geometry field (line 38) contains the name of the geometry file 208 that contains the actual visual models for the object. This file can be in a variety of formats including VRML 1.0, VRML 2.0, Inventor, and DXF. The geometry file 208 will, in turn, reference textures files 210 or other geometry files 208.

The name field (line 39) specifies the name of the component. This field is simply a string.

The signature field (line 40) is reserved for future use including the generation of a component signature string that can be used in combination with the name to uniquely identify components, even those having the same name but developed by different authors and thus having different content.

The version field (line 41) contains a string that can be used by tools to keep track of different versions of the same component.

The inheritance field (line 42) specifies the name of a component to use as a parent. Inheritance is an object-oriented concept in which a child inherits the properties of a parent and is given the opportunity to add to these properties or, in some cases, redefine the properties. In the case of components, the geometry (i.e., models), attributes, and behaviors of the parent are all passed down to the child. The child can then replace existing geometry, attributes, and behaviors or add more. In a preferred embodiment, the inheritance model used by components is single inheritance, i.e., a component can inherit from only a single parent. Multiple inheritance can also be implemented within the component paradigm.

The attributes section (lines 43–64) contains a set of attribute nodes that are based on a built-in PROTO known as an ASAttribute. Each attribute has a name, specified by the name field (lines 45, 50, 55, and 60), a type (lines 46, 51, 56, and 61), and a value which in some cases is mapped into a field contained in the interface specification (lines 23–35). When an external action reads or sets one of the fields in the interface of the component, this can result in a pass-through to the attribute contained internally in the component's implementation. Note that several of the attributes end in the phrase "Active" (e.g., lines 50, 55, and 60). These special Boolean attributes are desirably generated for each behavior and are used to toggle the behavior on and off. As an example of how these are used, in the sample world specified in the world file shown in Table 1, the walk behavior for the theHuman object will search for and set the isHit attribute on anything it collides with. Since the bench objects have such an attribute, it will be set whenever the theHuman object collides with the bench. The shakeWhenHit behavior for each bench monitors this attribute, executes a shake sequence whenever the attribute becomes TRUE, and then resets the isHit attribute to FALSE to await the next collision. One last note on attributes is that it is desirable that attribute information contained in the component implementation remains consistent with the interface specification and this is one of the responsibilities of the tools that create and manage component definitions.

The behaviors section (lines 65–78) contains a set of behavior nodes that are based on a built-in PROTO known as an ASBehavior. Each behavior corresponds to an EXTERNPROTO specified earlier in the component file. The "reverseOnCollisions" behavior on lines 66–69 is based on the EXTERNPROTO on lines (8–11) and is therefore an instantiation of this behavior for this component. The actual PROTO for the reverseOnCollisions behavior and its implementation are specified in behavior files and (optionally) Dynamic Link Libraries (DLL's), JAVA libraries, or JAVA Scripts. For each behavior, the corresponding Boolean "Active" attributes are mapped into the activate field which turns the behavior on and off. Thus, the activate field for reverseOnCollisions is mapped into the reverseOnCollisionsActive attribute. When the reverseOnCollisionsActive attribute becomes TRUE, the behavior turns on, and when it becomes FALSE, the behavior turns off. Again, tools are typically responsible for maintaining these connections and for ensuring the proper generation of the fields.

The rules section (lines 79–85) contains a set of rule nodes that are based on a built-in PROTO known as ASRule. Each rule contains a source field, a target field, and a type field that establishes a relationship between behaviors. In this example, on lines 80–84, a rule indicates that the walk and run behaviors are mutually exclusive and cannot therefore be active at the same time. Many kinds of rules are supported including exclusion (two behaviors that cannot be simultaneously active), triggering (one behavior automatically activating another), and suspending (wherein a second behavior suspends a first behavior until the second behavior deactivated). Other rules are possible because the type field is string based and new rule types can therefore be easily added provided that the browser or run-time is willing to enforce them. It is primarily up to the VRML browser or run-time to ensure that all rules are enforced.

The last section is the subcomponents section (lines 86–87) that contains a set of subcomponent nodes that are based on a built-in PROTO known as an ASSubComponent. Each subcomponent contains a count field to indicate the number of subcomponent, a name_seed which contain a stem (e.g., "missile") to use for naming all objects generated from the subcomponent (e.g., missile1, missile2, etc.), and a component node that specifies the component to use. Subcomponents differ from regular components in that the objects that they create are "owned by" and are under the complete control of the enclosing component. When an object is instantiated from a component that has a subcomponent specification, the instantiation also causes a series of sub-objects to be automatically instantiated from the subcomponent and placed under the control of the parent object. This feature can be useful when creating objects that manage many children (e.g., an attack aircraft that controls a number of surface-to-air missiles each of which is an object in its own right). The bench component file (not shown) is similar in content to the blockman component file.

Table 3 contains the specification for a behaviors library. Line 1 once again contains both a standard VRML header as well as a type header which in this case identifies a behavior file (#Aesthetic Solutions Behavior).

TABLE 3

A behavior file.

```
1    #VRML V2.0 utf8 #Aesthetic Solutions Behaviors
2
3    WorldInfo {
4        title    "behaviors.arl"
5        info     "version 1.0"
6    }
7
8    PROTO behaviors_reverseAfterCollisions [
9        field SFBool    activate FALSE
10       field SFString  name "reverseAfterCollisions"
11   ]
12   {
13       ASBehavior {
14           name       "behaviors:reverseAfterCollisions"
15           localname  IS name
16           activate   IS activate
17           events [
18               SFString "reversed"
19           ]
20           dependencies    [ ]
21           initialize Script {
22               url ["asinternal:
23                   MODULE    behaviors
24                   CALLBACK  reverseAfterCollisionsInit"
25               ]
26           }
27           action Script {
28               url [ "asinternal:
29                   MODULE    behaviors
30                   CALLBACK  reverseAfterCollisions"
31               ]
32           }
```

TABLE 3-continued

A behavior file.

```
33           finish Script {
34               url ["asinternal:
35                   MODULE    behaviors
36                   CALLBACK  reverseAfterCollisionsFini
37               ]
38           }
39       }
40   }
41
42   PROTO behaviors_run [
43       field SFBool    activate FALSE
44       field SFString  name    "run"
45   ]
46   {
47       ASBehavior {
48           name       "behaviors:run"
49           localname  IS name
50           activate   IS activate
51           events [
52               SFString "Collide"
53           ]
54           dependencies [
55               ASDependency {
56                   type "Part"
57                   name "LeftArm"
58               }
59               ASDependency {
60                   type "Part"
61                   name "LeftLeg"
62               }
63               ASDependency {
64                   type "Part"
65                   name "RightArm"
66               }
67               ASDependency {
68                   type "Part"
69                   name "RightLeg"
70               }
71               ASDependency {
72                   type "Attribute"
73                   name "Speed"
74               }
75           ]
76           initialize Script {
77               url ["asinternal:
78                   MODULE    behaviors
79                   CALLBACK  runInit" ]
80           }
81           action Script {
82               url [ "asinternal:
83                   MODULE    behaviors
84                   CALLBACK  run"
85               ]
86           }
87           finish Script {
88               url ["asinternal:
89                   MODULE    behaviors
90                   CALLBACK  runFini"
91           }
92       }
93   }
94
95   PROTO behaviors_walk [
96       field SFBool    activate FALSE
97       field SFString  name    " walk "
98   ]
99   {
100      ASBehavior {
101          name       "behaviors: walk "
102          localname  IS name
103          activate   IS activate
104          events [
105              SFString "Collide"
106          ]
```

TABLE 3-continued

A behavior file.

```
107         dependencies [
108             ASDependency {
109                 type    "Part"
110                 name    "LeftArm"
111             }
112             ASDependency {
113                 type    "Part"
114                 name    "LeftLeg"
115             }
116             ASDependency {
117                 type    "Part"
118                 name    "RightArm"
119             }
120             ASDependency {
121                 type    "Part"
122                 name    "RightLeg"
123             }
124             ASDependency {
125                 type    "Attribute"
126                 name    "Speed"
127             }
128         ]
129         initialize Script {
130             url ["asinternal:
131                 MODULE      behaviors
132                 CALLBACK    walk Init" ]
133         }
134         action Script {
135             url [ "asinternal:
136                 MODULE      behaviors
137                 CALLBACK    walk "
138             ]
139         }
140         finish                  Script {
141             url ["asinternal:
142                 MODULE      behaviors
143                 CALLBACK    walk Fini" ]
144         }
145     }
146 }
147
```

Lines 3–6 contain a WorldInfo node which, in this case, specifies the name of the behavior library and its version. Lines 8–36 contain the specification for a behavior. Lines 8–11 specify the interface, which must agree with the EXTERNPROTO references in component files that make use of this behavior and lines 12–36 contain the implementation although part of the implementation is provided in other files (such as a *.dll file).

The first part of the implementation contains a "global" name (line 14) that uniquely identifies the behavior within the overall set of all behaviors. Typically, the name of the library (e.g., "behaviors") is prefixed to the behavior name with a colon separator, hence:

"behaviors"+"reverseAfterCollisions"= "behaviors::reverseAfterCollisions." This ensures a unique name since no two behavior libraries should have the same name (tools enforce this condition).

On line 15, the implementation specifies that the local name of the behavior, which is the name by which the behavior is known within a component. This name is defaulted in the interface on line 10, but can be overridden by a component to be any name desired.

On line 16, the activate field for the behavior, i.e., the field used to turn the behavior on and off, is mapped into the activate field of the interface. Thus, an object can turn the behavior on and off at run-time by toggling the value of this field.

Lines 17–19 contain an event specification for the behavior. This specification lists all of the events that the behavior can emit during execution. In this example, the reveserAfterCollisions behavior can emit a "reverse" event. Other objects wishing to be notified when the object containing this behavior has reversed directions can "subscribe" to this event, receive a notification at run-time, and therefore react when specific objects containing this behavior have reversed their directions.

Line 20 contains a dependency specification for the behavior. The reverseAfterCollisions behavior has no dependencies, but the run and walk behaviors, as shown on lines 52–73 and 105–126, do. Dependencies are based on a built-in PROTO known as ASDependency and are used by tools to determine the compatibility of a behavior with a given component. In order to be considered completely compatible, a object must contain the parts and attributes specified in the behavior's dependency set. Tools can use whatever policy they deem appropriate for enforcing component-behavior compatibility. The association of incompatible behaviors with a component can still be allowed as long as this causes no harm at run-time—it will simply not work as expected.

Lines 21–38 contain specifications for the actual code to be used for executing the behavior. A variety of different code types can be used including C/C++ compiled code, Java, and JAVA Script. The code specification comes in three (optional) parts known as initialize (lines 21–25), action (lines 26–31), and finish (lines 32–37). Each part has an associated "script" which is simply a reference to a Dynamic Link Library (for compiled C/C++ behaviors), a Java source file, or a JAVA Script source file. The initialize script is intended to be executed once just after the behavior is activated. The action script is intended to be executed continuously as long as the behavior is activated. The finish script is intended to be executed once just after the behavior is deactivated. In the example shown, all behaviors are implemented as compiled C/C++ behaviors (lines 22–25, 28–31, and 34–37). In each case, the MODULE field specifies the DLL in which the code can be found, and the CALLBACK field identifies the specific routine that contains the code. In the case of Java source files or JAVA Script sources files, the url would contain only a single reference to the target file.

Since geometry files, texture files, audio files, Java/JAVA Script source files, and C/C++ source files contains standard content according to their types (e.g., Geometry in DXF or VRML, texture in JPEG or BMP, audio in Wave or AIFC, etc.) examples of such files are not included in this example.

One of the advantageous characteristics of these files is the ability to reuse and recombine information within and across files of different types. This is one of the many benefits of the present invention. For example, worlds can reuse components, components can reuse behaviors and geometry, geometry can reuse textures, and behaviors can reuse source code and audio. The present invention thus provides a framework for this reuse and recombination. The component builder and other tools enforce the protocol and ensure consistency. The file format is somewhat irrelevant. VRML 2.0 is preferred as a syntax largely because it is widely used. Other embodiments of the invention may use a proprietary text-based file format, and other file formats could be used as well.

Parts

A complete listing of the blockman component (also called "theHuman" in the above examples) is provided as Appendix A. One skilled in the art will recognize that this example merely illustrates how the visual aspects of a component are defined and that an unlimited number of components can be defined using the techniques disclosed herein. The blockman component in Appendix A is constructed largely from Parts. A sample part, taken from Appendix A is reproduced in Table 4 below.

TABLE 4

A sample part from the blockman component listed in Appendix A.

```
1    ASPart {
2        name "HEAD"
3        translation 0 30 0
4        children [
5            ASPart {
6                name "HEAD_Part"
7                translation 0 8.333282 0
8                geometry [
9                    Shape {
10                       appearance Appearance {
11                           material Material { diffuseColor 1 1 1 }
12                       }
13                       geometry IndexedFaceSet {
14                           coord Coordinate {
15                               point [
16                                   -3.417969 -8.333282 3.417969,
17                                   3.416702 -8.333282 3.417969,
18                                   -3.417969 -8.333282 -3.416702,
19                                   3.416702 -8.333282 -3.416702,
20                                   5.000000 8.333282 5.000000,
22                                   -5.000000 8.333282 5.000000,
22                                   5.000000 8.333282 -5.000000,
23                                   -5.000000 8.333282 -5.000000 ]
24                           }
25                           coordIndex [
26                               1, 4, 5, 0, -1,
27                               2, 7, 6, 3, -1,
28                               4, 6, 7, 5, -1,
29                               4, 1, 3, 6, -1,
30                               2, 0, 5, 7, -1,]
31                           colorPerVertex FALSE
32                       }
33                   }
34               ]
35           } #end HEAD_Part
36       ]
37   } #end HEAD
```

Table 4 illustrates the definition of a pair of nested parts "HEAD" and "HEAD_Part". The definition of "HEAD" (in Lines 1-37) is based on a built-in PROTO known as ASPart as shown in Line 1. The name field (Line 2) contains the name of the part, "HEAD" in this case. A translation field in Line 3 contains the location of the part with respect to the rest of the blockman component. The "HEAD" part has no geometry of it's own, rather "HEAD" is a collection of subparts (child parts). Children of the "HEAD" part are defined as part of a children section beginning on Line 4 and ending on Line 36. The "HEAD" part has only one child "HEAD_Part" defined in Lines 5–35. Head part is also constructed from an ASPart node, and contains a name field (Line 6) and a translation field (Line 7). Unlike its parent part (HEAD), the child part (HEAD_Part) does contain actual displayable geometry items specified by a standard VRML geometry node (Line 8) and its contents (Lines 9—32). The "HEAD_Part" has no children.

The use of a part hierarchy, and the ability to define components as collections of parts, and parts as collections of other parts, provides great flexibility in defining the visual aspects of a component, and great flexibility when tying a behavior to a components. In the above example, the blockman component has many parts, one of which is "HEAD." When the run behavior causes blockman to run, the head moves with blockman because it is part of the whole blockman component.

Further, the specification of blockman could be enhanced to link "HEAD" to a behavior such as nod-head. The nod-head operation would cause the head part to nod regardless of how the head part is defined, and however many child parts it contains. Even if the definition of "HEAD" changes, the nod-head behavior will still be tied to "HEAD" and it will still cause the head to nod. Further still, the definition of head could be modified by adding a pair of eyes as eye parts (the eye parts would be child parts that are siblings of HEAD_Part and the eye parts could be tied to a roll-eyes behavior. This would have no effect on the nod-head operation because the eyes are child parts of the head (the eyes would move with the head). Conversely, the nod-eyes operation could operate totally independently of the nod-head operation. In other words, nod-head would move the head, eyes and all, and roll-eyes would move only the eyes. Thus blockman could nod his head and simultaneously roll his eyes, or perform each operation separately.

The above discussion does not imply that there is necessarily a one-to-one correspondence between a behavior and a part. For example, an advanced behavior such as running could move the arms, legs, and other parts of blockman in order to produce a realistic model of a running person. Thus, an advanced run behavior could have logical connections to many parts of the blockman component.

Views

A sample view file is listed in Table 5.

TABLE 5

A View file for Sample World.

```
1    #VRML V2.0 utf8 #Aesthetic Solutions View
2
3    WorldInfo {
4        title      "RadarView"
5        info       "version 1.0"
6    }
7
8    EXTERNPROTO radar [
9        field    SFFloat      range
10       field    SFBool       trackingActive
11   ] [ "radar.wrl#radar" ]
12
13   EXTERNPROTO guage [
14       field    SFString     objectName
15       field    SFString     attributeName
16       field    SFBool       trackingActive
17   ] [ "guage.wrl#guage" ]
18
19
20   Transform {
21       translation 0      0      0
22       scale       1      1      1
23       children [
24           DEF ConsoleRadar radar {
25               range          1000
26               trackingActive TRUE
27           }
28   }
29
30   Transform {
31       translation 0      0      0
32       scale       1      1      1
33       children [
34           DEF ConsoleSpeedGuage guage {
35               objectName     theHuman
36               attributeName  speed
37               trackingActive TRUE
39           }
40   }
41
42
43
44   DEF AttachedCamera ASCameraMapping {
45       objectName   theHuman
46       partName     head
```

TABLE 5-continued

A View file for Sample World.

```
47      offset             0        0      20
48      orientation        0        1       0        0
49    }
50
51 DEF    RunKey          ASKeyMapping {
52      key                r
53      event              up
54      action             activateBehavior
55      objectName         theHuman
56      behaviorName       run
57    }
58
59 DEF    StopRunKey      ASKeyMapping {
60      key                s
61      event              up
62      action             deactivateBehavior
63      objectName         theHuman
64      behaviorName       run
65    }
66
67 DEF    EndKey          ASKeyMapping {
68      key                end
69      event              up
70      action             exitWorld
71    }
72
73 DEF Steering           ASMouseMapping {
74      event              button1_up
75      targetType         consoleObject
76      targetName         ConsoleSpeedGuage
77      action             toggleBehavior
78      behaviorName       tracking
79    }
80
81 DEF SBSteering         ASSpaceballMapping {
82      event              twist
83      action             orientObject
84      objectName         theHuman
85    }
86
87 DEF HMDCamera          ASHMDMapping {
88      event              move
89      action             orientPart
90      objectName         theHuman
91      partName           head
92    }
93
94
```

Line 1 of the view file in Table 5 contains the standard heading for a VRML 2.0 file ("#VRML V2.0 utf8") and an additional heading ("#Aesthetic Solutions View") which identifies the file as a view. The usual WorldInfo node is contained in lines 3–6. This node contains information used to specify the name and version associated with this view. Lines 8–17 contain EXTERNPROTO's for two components. Listings for the definitions of the components referenced in lines 8–17 are not shown but they would be similar in format to the file provided for the blockman component listed in Appendix A. Although, lines 8–17 define the interfaces for components just as they would in the world file (e.g., refer to lines 12–35 in Table 1), the components here are used very differently in the view file. In a view file, components are used as part of a user "console." The console is a collection of objects that stays in front of the camera at all times. The console is therefore designed to be a kind of control panel that sits in front of the user 102 as he/she navigates through the world 108. The fuel gauge 115 shown in FIG. 1 is an example of a console component.

There are important traits of components instantiated into the console. First, the components instantiated into the console are not part of the world and cannot be seen or interacted with by objects in the world (thus FIG. 1 does not show the component 115 as being part of the world 108). The converse, however, is not true because console objects can interact with or even control objects in the world 108. One of the key uses of console objects is to control an object or objects in the world. Other key uses of the console are to provide world navigation devices and to provide a means to monitor objects in a world. Thus, the components in the console are functionally analogous to user controls (e.g., buttons, scroll bars, etc.) in the familiar windows operating environment. However, the console components are far different from standard windows controls, because the console components, like all of the virtual reality components-herein, have a separate visual model and a separate behavior model. Windows controls have no such paradigm. Further, the console components are described and rendered in the same three-dimensional space as the virtual world 108. Thus, even though the console components are not part of the virtual world, they are rendered as if they were. The console components are attached to the camera, so that as the camera moves through the virtual world, the controls move with the camera. Thus, the console components will (if properly defined) always appear in the same position on the user's display as the user moves the camera through the virtual world.

On lines 20–39, the components are instantiated into the console. In a preferred embodiment, all instantiations of components in a view file are instantiated into the console and no components are instantiated into the world through a view. Instantiation of components into the world is done in a world file. The translation and scale fields in the instantiations on lines 20–39 control the placement of the instantiated objects relative to the console. Objects can also be rotated so that they appear at an angle to the user. Using this instantiation technique and the ability to control the positioning and shape of the instantiated objects, a fairly complex console can be created and used to control or view a world. On lines 24–27, the instantiated radar console object is configured to track objects up to 1000 meters from the current viewpoint. This object will display all objects within its range radius as "blips" on its face in the console. On lines 34–38, the instantiated gauge console object is configured to monitor the speed attribute of the object "theHuman."

On lines 44–49, an "attached camera" is added to the view. An attached camera is a camera that is connected to a specific object and (optionally) a specific part. When a camera is attached in this way, it is no longer under direct user control (the player will ignore all subsequent camera controls) because the camera will move with the object and the part to which it is attached, thereby providing an object-level view of the world. Line 45 and 46 identify the object and the part to which to attach, respectively. Line 47 specifies an offset that determines how far away from the designated object/part the camera should float. Line 48 specifies an orientation so that the camera can look off at an angle is desired.

Lines 51 through the end of the file contain various I/O device control specifications. Lines 51–71 contain control specifications for keyboard events. Lines 73–79 contain mouse control specifications. Lines 81–85 contain control specifications for a special 3D pointing device known as a Spaceball. Lines 87–92 contain control specifications for a Head Mounted Display (HMD) with a tracker. One skilled in the art will recognize that the types contained in this section of the view file are totally extensible. The specifications provided here are merely examples. As support for new devices is added, new control type specifications will also be added. It is also important to note that each control specification is extremely extensible internally, and the examples shown are only a small subset of what is possible.

In the keyboard control specification on lines 51–57, for example, the following is being set up: The "run" behavior on the object "theHuman" will be activated when the "r" key is pressed and then released. The key field identifies the key on the keyboard. The event field identifies what kind of event to respond to, which in the case a keyboard is limited to a key "down" or key "up." The action field identifies what to do in response to the designated event. There are many choices that are supported in various combinations by the various device types, several of which are illustrated in the example, including, but not limited to: 1) Activating a behavior (i.e., turning it on), 2) Deactivating a behavior (turning it off), 3) Stepping a behavior (firing it for one cycle only), 4) Toggling a behavior between on and off, 5) Controlling the orientation of an object, 6) Changing the position of an object, 7) Exiting the world, and 8) Assigning or routing a value to an attributes in a specific object.

The mouse control specification on lines 73–79 demonstrates that events can also be routed into console objects. In this case, use of the first button on the mouse to select a specific console object (e.g., ConsoleSpeedGauge) will cause the gauge's tracking behavior to turn on and off (i.e., to toggle).

The special device control specifications on lines 81–92 are similar to the mouse and keyboard control specification except that they involve events that are less familiar (e.g., a 'twist' of the spaceball and a "move" of the head mounted display (HMD) as a result of the user turning his/her head). In each case, the control specifications demonstrate a common theme: A specific event from a specific device is mapping into some action on the world or view and their contents including the camera.

Inconsistent information, conflicts, and errors within a view file are gracefully handled by the player. For example, an attempt to map a control specification into a non-existent object in a world simply has no effect and does not cause the world to crash or terminate. This ensures that a generic view can be created and easily associated with a variety of different worlds. Only the relevant specifications in the view will apply. This allows truly portable user interfaces to be developed and arbitrarily matched with different worlds.

The Registry

The Microsoft Windows operating system makes use of a registry to keep track of installed programs and libraries. The Apple Macintosh also uses something similar to keep track of applications and their associated file types. Other non-VR kinds of component technologies such as OLE/Active X also makes use of a registry to keep track of installed components. The present invention extends the concept and the functionality of a registry such that it can be used to keep track of components and other resources needed to display a virtual world. There are clear advantages to this in that it eliminates the need to place long, onerous path names in front of every file referenced and it has the potential for greatly reducing network download time. The referenced components in a world, for example, might be installed locally on a client's disk when a world is downloaded from a server. The player can simply check the registry to see if the components are loaded. If the components are installed, they are loaded from the local disk. The exact location and names of the files needed is resolved through the registry. If the components are not installed, they can be downloaded from the server and installed into the local registry for local retrieval next time the world (or any world using the same components) is downloaded. This is similar to the way that HTML browsers store web site caches on the local disk, but it is much more sophisticated because it adds a level of abstraction to the process. The component, therefore, is a conceptual representation that may involve a number of files including geometry files, behavior files, code, audio clips, textures, etc. The registry keeps track of both the conceptual component and all of the implementation details.

Other Embodiments

One skilled in the art will recognize that, although much of the above detailed description used VRML code fragments to explain some aspects of the invention, the invention is not limited to any particular language or syntax. In particular, the scope of the invention is not limited to any particular VR file or language format. The scope of the invention is not limited to the VRML world (.wrl) file format or the extensions used in the examples. Nor is the scope of the invention limited to text files, thus, the use of a binary file format, VRML or otherwise, is within the scope of the invention.

Appendix A

This appendix contains a listing of the definition of the visual model of the blockman component used as an example herein.

```
#VRML V2.0 utf8 #Aesthetic Solutions Geometry

EXTERNPROTO ASPart [
          exposedField    SFString        name
          exposedField    SFVec3f         translation
          exposedField    SFRotation      rotation
          exposedField    SFVec3f         scale
          exposedField    SFRotation      scaleOrientation
          exposedField    SFVec3f         center
          exposedField    MFNode          geometry
          exposedField    MFNode          children
] ["asextensions.wrl#ASPart"]

ASPart {
  name "MAN"
  children [
    ASPart {
      name "CHEST"
      translation 0 11.667 0
      children [

ASPart {
          name "CHEST_Part"
          translation 0 15 0
          geometry [
            Shape {
              appearance Appearance {
                material Material { diffuseColor 1 1 1 }
              }
              geometry IndexedFaceSet {
                coord Coordinate {
                  point [
                    -7.800781 -14.999954 3.000000,
                    7.799957 -14.999954 3.000000,
                    -7.800781 -14.999954 -3.000000,
                    7.799957 -14.999954 -3.000000,
                    13.000000 15.000000 5.000000,
                    -13.000000 15.000000 5.000000,
                    13.000000 15.000000 -4.999985,
                    -13.000000 15.000000 -4.999985 ]
                }
                coordIndex [
                1,   4,  5,   0,   -1,
                2,   7,  6,   3,   -1,
                4,   6,  7,   5,   -1,
                4,   1,  3,   6,   -1,
```

Appendix A

```
              2,  0,  5,  7,  -1,]
            colorPerVertex FALSE
          }
        }
      ]
    } #end CHEST_Part ASPart {
      name "HEAD"
      translation 0 30 0
      children [
        ASPart {
          name "HEAD_Part"
          translation 0 8.333282 0
          geometry [
            Shape {
              appearance Appearance {
                material Material { diffuseColor 1 1 1 }
              }
              geometry IndexedFaceSet {
                coord Coordinate {
                  point [
                    -3.417969 -8.333282  3.417969,
                     3.416702 -8.333282  3.417969,
                    -3.417969 -8.333282 -3.416702,
                     3.416702 -8.333282 -3.416702,
                     5.000000  8.333282  5.000000,
                    -5.000000  8.333282  5.000000,
                     5.000000  8.333282 -5.000000,
                    -5.000000  8.333282 -5.000000 ]
                }
                coordIndex [
                  1,  4,  5,  0,  -1,
                  2,  7,  6,  3,  -1,
                  4,  6,  7,  5,  -1,
                  4,  1,  3,  6,  -1,
                  2,  0,  5,  7,  -1,]
                colorPerVertex FALSE
              }
            }
          ]
        } #end HEAD_Part
      ]
    } #end HEAD ASPart {
      name "L_ARM"
      translation 13.333298 30 0
      children [
        ASPart {
          name "L_ARM_Part"
          translation 3.333405 -8.333282 0
          geometry [
            Shape {
```

Appendix A

46

```
            appearance Appearance {
              material Material { diffuseColor 1 1 1 }
            }
            geometry IndexedFaceSet {
              coord Coordinate {
                point [
                  -3.333298 -8.333282  3.332031,
                   3.333298 -8.333282  3.332031,
                  -3.333298 -8.333282 -3.333298,
                   3.333298 -8.333282 -3.333298,
                   3.333298  8.333282  3.332031,
                  -3.333298  8.333282  3.332031,
                   3.333298  8.333282 -3.333282,
                  -3.333298  8.333282 -3.333282 ]
              }
              coordIndex [
                1, 4, 5, 0,  -1,
                2, 7, 6, 3,  -1,
                4, 6, 7, 5,  -1,
                4, 1, 3, 6,  -1,
                3, 1, 0, 2,  -1,
                2, 0, 5, 7,  -1 ]
              colorPerVertex FALSE
            }
          }
        ]
      } #end L_ARM_Part ASPart {
        name "L_FORARM"
        translation 3.333405 -16.666702 3.332031
        children [
          ASPart {
            name "L_FORARM_Part"
            translation 0 -8.333282 0
            geometry [
              Shape {
                appearance Appearance {
                  material Material { diffuseColor 1 1 1 }
                }
                geometry IndexedFaceSet {
                  coord Coordinate {
                    point [
                      -1.666809 -8.333282 -1.664063,
                       1.666702 -8.333282 -1.664063,
                      -1.666809 -8.333282 -4.998734,
                       1.666702 -8.333282 -4.998734,
                       3.333298  8.333282  0.000000,
                      -3.333298  8.333282  0.000000,
                       3.333298  8.333282 -6.665314,
                      -3.333298  8.333282 -6.665314 ]
                  }
                  coordIndex [
                    1, 4, 5, 0,  -1,
```

Appendix A

47

```
                        2, 7, 6, 3,   -1,
                        4, 6, 7, 5,   -1,
                        4, 1, 3, 6,   -1,
                        3, 1, 0, 2,   -1,
                        2, 0, 5, 7,   -1 ]
                      colorPerVertex FALSE
                    }
                  }
                ]
              } #end L_FORARM_Part ASPart {
                name "L_HAND"
                translation -1.666702 -16.666595 -3.332031
                geometry [
                  Shape {
                    appearance Appearance {
                      material Material { diffuseColor 1 1 1 }
                    }
                    geometry IndexedFaceSet {
                      coord Coordinate {
                        point [
                          0.833298 -6.666595 2.500000,
                          2.500092 -6.666595 2.500000,
                          0.833298 -6.666595 -2.500000,
                          2.500092 -6.666595 -2.500000,
                          3.333405 0.000015 2.500000,
                          0.000000 0.000015 2.500000,
                          3.333405 0.000015 -2.500000,
                          0.000000 0.000015 -2.500000 ]
                      }
                      coordIndex [
                        1, 4, 5, 0,   -1,
                        2, 7, 6, 3,   -1,
                        4, 6, 7, 5,   -1,
                        4, 1, 3, 6,   -1,
                        3, 1, 0, 2,   -1,
                        2, 0, 5, 7,   -1 ]
                      colorPerVertex FALSE
                    }
                  }
                ]
              } #end L_HAND
            ]
          } #end L_FORARM
        ]
      } #end L_ARM ASPart {
        name "R_ARM"
        translation -13.332031 30 0
        children [
          ASPart {
            name "R_ARM_Part"
```

Appendix A

```
            translation -3.335938 -8.333282 0
            geometry [
              Shape {
                appearance Appearance {
                  material Material { diffuseColor 1 1 1 }
                }
                geometry IndexedFaceSet {
                  coord Coordinate {
                    point [
                      -3.333298 -8.333282 3.332031,
                      3.333298 -8.333282 3.332031,
                      -3.333298 -8.333282 -3.333298,
                      3.333298 -8.333282 -3.333298,
                      3.333298 8.333282 3.332031,
                      -3.333298 8.333282 3.332031,
                      3.333298 8.333282 -3.333282,
                      -3.333298 8.333282 -3.333282 ]
                  }
                  coordIndex [
                    1, 4, 5, 0,  -1,
                    2, 7, 6, 3,  -1,
                    4, 6, 7, 5,  -1,
                    4, 1, 3, 6,  -1,
                    3, 1, 0, 2,  -1,
                    2, 0, 5, 7,  -1 ]
                  colorPerVertex FALSE
                }
              }
            ]
          } #end R_ARM_Part ASPart {
            name "R_FORARM"
            translation -3.335938 -16.666702 3.332031
            children [
              ASPart {
                name "R_FORARM_Part"
                translation 0 -8.333282 0
                geometry [
                  Shape {
                    appearance Appearance {
                      material Material { diffuseColor 1 1 1 }
                    }
                    geometry IndexedFaceSet {
                      coord Coordinate {
                        point [
                          -1.666809 -8.333282 -1.664063,
                          1.666702 -8.333282 -1.664063,
                          -1.666809 -8.333282 -4.998734,
                          1.666702 -8.333282 -4.998734,
                          3.333298 8.333282 0.000000,
                          -3.333298 8.333282 0.000000,
                          3.333298 8.333282 -6.665314,
                          -3.333298 8.333282 -6.665314 ]
```

Appendix A

49

```
          }
          coordIndex [
            1, 4, 5, 0,  -1,
            2, 7, 6, 3,  -1,
            4, 6, 7, 5,  -1,
            4, 1, 3, 6,  -1,
            3, 1, 0, 2,  -1,
            2, 0, 5, 7,  -1 ]
          colorPerVertex FALSE
        }
      }
    ]
  } #end R_FORARM_Part ASPart {
    name "R_HAND"
    translation 1.667969 -16.666595 -3.332031
    geometry [
      Shape {
        appearance Appearance {
          material Material { diffuseColor 1 1 1 }
        }
        geometry IndexedFaceSet {
          coord Coordinate {
            point [
              -0.832031 -6.666595 2.500000,
              -2.500000 -6.666595 2.500000,
              -0.832031 -6.666595 -2.500000,
              -2.500000 -6.666595 -2.500000,
              -3.332031 0.000015 2.500000,
              0.000000 0.000015 2.500000,
              -3.332031 0.000015 -2.500000,
              0.000000 0.000015 -2.500000 ]
          }
          coordIndex [
            0, 5, 4, 1,  -1,
            3, 6, 7, 2,  -1,
            5, 7, 6, 4,  -1,
            6, 3, 1, 4,  -1,
            2, 0, 1, 3,  -1,
            7, 5, 0, 2,  -1 ]
          colorPerVertex FALSE
        }
      }
    ]
  } #end R_HAND
    ]
   } #end R_FORARM
  ]
 } #end R_ARM
]
} #end CHEST
```

Appendix A

50

```
ASPart {
  name "HIPS"
  translation 0 11.666718 0
  children [
    ASPart {
      name "HIPS_Part"
      translation 0 -6.666595 0
      geometry [
        Shape {
          appearance Appearance {
            material Material { diffuseColor 1 1 1 }
          }
          geometry IndexedFaceSet {
            coord Coordinate {
              point [
                10.000000 -6.668091 3.000000,
                -10.000000 -6.668091 3.000000,
                10.000000 -6.668091 -6.000000,
                -10.000000 -6.668091 -6.000000,
                -10.000000 6.666595 3.000000,
                10.000000 6.666595 3.000000,
                -10.000000 6.666595 -6.000000,
                10.000000 6.666595 -6.000000 ]
            }
            coordIndex [
              0, 5, 4, 1,   -1,
              3, 6, 7, 2,   -1,
              5, 7, 6, 4,   -1,
              6, 3, 1, 4,   -1,
              2, 0, 1, 3,   -1,
              7, 5, 0, 2,   -1 ]
            colorPerVertex FALSE
          }
        }
      ]
    } #end HIPS_Part ASPart {
      name "L_LEG"
      translation 6.5 -5 -1.5
      children [
        ASPart {
          name "L_LEG_Part"
          translation 0 -14.998749 0
          geometry [
            Shape {
              appearance Appearance {
                material Material { diffuseColor 1 1 1 }
              }
              geometry IndexedFaceSet {
                coord Coordinate {
                  point [
                    3.333405 -15.000000 3.332031,
                    -3.333405 -15.000000 3.332031,
```

Appendix A

```
              3.333405 -15.000000 -1.666702,
              -3.333405 -15.000000 -1.666702,
              -5.000000 14.998749 4.500000,
              5.000000 14.998749 4.500000,
              -5.000000 14.998749 -4.500000,
              5.000000 14.998749 -4.500000 ]
            }
            coordIndex [
            0, 5, 4, 1,   -1,
            3, 6, 7, 2,   -1,
            5, 7, 6, 4,   -1,
            6, 3, 1, 4,   -1,
            2, 0, 1, 3,   -1,
            7, 5, 0, 2,   -1 ]
            colorPerVertex FALSE
          }
        }
      ]
    } #end L_LEG_Part ASPart {
      name "L_CALF"
      translation 0.000107 -29.998749 -1.833298
      children [
        ASPart {
          name "L_Calf_Part"
          translation 0 -15 0
          geometry [
            Shape {
              appearance Appearance {
                material Material { diffuseColor 1 1 1 }
              }
              geometry IndexedFaceSet {
                coord Coordinate {
                  point [
                  1.666687 -15.000000 5.001266,
                  -1.666702 -15.000000 5.001266,
                  1.666687 -15.000000 0.000000,
                  -1.666702 -15.000000 0.000000,
                  -3.333313 15.000000 6.665329,
                  3.333298 15.000000 6.665329,
                  -3.333313 15.000000 0.000000,
                  3.333298 15.000000 0.000000 ]
                }
                coordIndex [
                0, 5, 4, 1,   -1,
                3, 6, 7, 2,   -1,
                5, 7, 6, 4,   -1,
                6, 3, 1, 4,   -1,
                2, 0, 1, 3,   -1,
                7, 5, 0, 2,   -1 ]
                colorPerVertex FALSE
              }
            }
```

Appendix A

52

```
        }
      } #end L_CALF_Part

ASPart {
        name "L_FOOT"
        translation 0.249893 -30.000000 2.791595
        geometry [
          Shape {
            appearance Appearance {
              material Material { diffuseColor 1 1 1 }
            }
            geometry IndexedFaceSet {
              coord Coordinate {
                point [
                   3.333298 -5.000000 12.209671,
                  -3.333298 -5.000000 12.209671,
                   3.333298 -5.000000 -4.458328,
                  -3.333298 -5.000000 -4.458328,
                  -3.333298 -1.667969 12.209671,
                   3.333298 -1.667969 12.209671,
                  -3.333298  0.000000 -4.458328,
                   3.333298  0.000000 -4.458328 ]
              }
              coordIndex [
                0, 5, 4, 1,  -1,
                3, 6, 7, 2,  -1,
                5, 7, 6, 4,  -1,
                6, 3, 1, 4,  -1,
                2, 0, 1, 3,  -1,
                7, 5, 0, 2,  -1 ]
              colorPerVertex FALSE
            }
          }
        ]
      } #end L_FOOT
    ]
  } #end L_CALF
 ]
} #end L_LEG ASPart {
  name "R_LEG"
  translation -6.5 -5 -1.5
  children [
    ASPart {
      name "R_LEG_Part"
      translation 0 -14.998749 0
      geometry [
        Shape {
          appearance Appearance {
            material Material { diffuseColor 1 1 1 }
          }
          geometry IndexedFaceSet {
            coord Coordinate {
```

Appendix A

53

```
              point [
                3.333405 -15.000000 3.332031,
                -3.333405 -15.000000 3.332031,
                3.333405 -15.000000 -1.666702,
                -3.333405 -15.000000 -1.666702,
                -5.000000 14.998749 4.500000,
                5.000000 14.998749 4.500000,
                -5.000000 14.998749 -4.500000,
                5.000000 14.998749 -4.500000 ]
              }
              coordIndex [
                0, 5, 4, 1,   -1,
                3, 6, 7, 2,   -1,
                5, 7, 6, 4,   -1,
                6, 3, 1, 4,   -1,
                2, 0, 1, 3,   -1,
                7, 5, 0, 2,   -1 ]
              colorPerVertex FALSE
            }
        }
      ]
    } #end R_LEG_Part ASPart {
      name "R_CALF"
      translation 0 -29.998749 -1.833298
      children [
      ASPart {
        name "R_Calf_Part"
        translation 0 -15 0
        geometry [
          Shape {
            appearance Appearance {
              material Material { diffuseColor 1 1 1 }
            }
            geometry IndexedFaceSet {
              coord Coordinate {
                point [
                  1.666687 -15.000000 5.001266,
                  -1.666702 -15.000000 5.001266,
                  1.666687 -15.000000 0.000000,
                  -1.666702 -15.000000 0.000000,
                  -3.333313 15.000000 6.665329,
                  3.333298 15.000000 6.665329,
                  -3.333313 15.000000 0.000000,
                  3.333298 15.000000 0.000000 ]
                }
              coordIndex [
                0, 5, 4, 1,   -1,
                3, 6, 7, 2,   -1,
                5, 7, 6, 4,   -1,
                6, 3, 1, 4,   -1,
                2, 0, 1, 3,   -1,
                7, 5, 0, 2,   -1 ]
```

Appendix A

54

```
                    colorPerVertex FALSE
                  }
                }
              ]
            } #end R_CALF_Part ASPart {
              name "R_FOOT"
              translation -0.25 -30 2.791595
              geometry [
                Shape {
                  appearance Appearance {
                    material Material { diffuseColor 1 1 1 }
                  }
                  geometry IndexedFaceSet {
                    coord Coordinate {
                      point [
                        3.333298 -5.000000 12.209671,
                        -3.333298 -5.000000 12.209671,
                        3.333298 -5.000000 -4.458328,
                        -3.333298 -5.000000 -4.458328,
                        -3.333298 -1.667969 12.209671,
                        3.333298 -1.667969 12.209671,
                        -3.333298 0.000000 -4.458328,
                        3.333298 0.000000 -4.458328 ]
                    }
                    coordIndex [
                      0, 5, 4, 1,  -1,
                      3, 6, 7, 2,  -1,
                      5, 7, 6, 4,  -1,
                      6, 3, 1, 4,  -1,
                      2, 0, 1, 3,  -1,
                      7, 5, 0, 2,  -1 ]
                    colorPerVertex FALSE
                  }
                }
              ]
            } #end R_FOOT
          ]
        } #end R_CALF
      ]
    } #end R_LEG
  ]
} #end HIPS
]
} #end MAN
```

Appendix A

55

Appendix B

```
#VRML V2.0 utf8 #Aesthetic Solutions Extensions

5   #------------------------------------------------------------------------
    #  Created by Aesthetic Visions(R) Toolset
    #  Copyright (c) 1997 Aesthetic Solutions, Inc.  All rights reserved.
    #------------------------------------------------------------------------
    #
10  #**********************************************************************
    #**********************************************************************
    #****                                                               ****
    #****                        !!!!WARNING!!!!                        ****
    #****                                                               ****
15  #****                                                               ****
    #****   THE FILES DISTRIBUTED WITH THIS AESTHETIC SOLUTIONS PRODUCT ****
    #****   MUST NOT BE ALTERED BY ANY MEANS OTHER THAN EXECUTION OF    ****
    #****   TOOLS PROVIDED BY AESTHETIC SOLUTIONS.  IF ANY FILES,       ****
    #****   WHICH HAVE BEEN DISTRIBUTED WITH, OR CREATED BY THE         ****
20  #****   AESTHETIC SOLUTIONS TOOLSET, APPLICATIONS WHICH REQUIRE     ****
    #****   THESE FILES MAY NOT WORK PROPERLY.                          ****
    #****                                                               ****
    #**********************************************************************
    #**********************************************************************
25

PROTO ASDependencies [
             field MFString attributes     []
             field MFString parts          []
    ] {}
30
    PROTO ASBehavior [
             field         SFString name            ""
             field         SFString localname       ""
             field         SFBool   activate        FALSE
35           field         MFString events          []
             field         SFNode   dependencies    NULL
             exposedField  SFNode   component       NULL
             field         SFNode   initialize      NULL
             field         SFNode   action          NULL
40           field         SFNode   finish          NULL
             field         SFNode   timer           NULL
             field         SFBool   notifyOnTick    FALSE
             field         SFBool   notifyOnActivate FALSE
             field         SFBool   notifyOnDeactivate  FALSE
45           eventIn       SFBool    set_activate
             eventIn       SFNode    set_action
             eventIn       SFNode    init
             eventIn       SFBool    set_notifyOnActivate
             eventIn       SFBool    set_notifyOnDeactivate
50           eventIn       SFBool    set_notifyOnTick
             eventIn       SFNode    set_timer
             eventOut      SFBool    activate_changed
```

```
            eventOut    SFNode      timer_changed
    ]
    {
        Script {
            field       SFNode      action              IS action
            field       SFBool      activate            IS activate
            field       SFNode      timer               IS timer
            field       SFBool      notifyOnActivate    IS
notifyOnActivate
            field       SFBool      notifyOnDeactivate  IS
notifyOnDeactivate
            field       SFBool      notifyOnTick        IS  notifyOnTick
            eventIn     SFNode       set_action         IS set_action
            eventIn     SFBool       set_activate       IS set_activate
            eventIn     SFNode       init               IS init
            eventIn     SFBool       set_notifyOnActivate IS
set_notifyOnActivate
            eventIn     SFBool       set_notifyOnDeactivate  IS
set_notifyOnDeactivate
            eventIn     SFBool       set_notifyOnTick    IS
set_notifyOnTick
            eventOut SFBool     activate_changed       IS
activate_changed
            eventOut SFNode     timer_changed          IS timer_changed directOutput    TRUE url [ "behavior.js" ]
        }
    }

PROTO ASGeometry [
            field MFString url         []
            field SFNode       node    NULL
    ]
    {
            DEF GeoLoader Script {
                field   SFNode    self  USE GeoLoader
                field   SFNode    node  IS node
                field   MFString  geoFile IS url
                eventIn MFNode    nodesLoaded url ["javascript:
                    function nodesLoaded(value){
                        node.addChildren = value;
                    } function initialize(value){
                        Browser.createVrmlFromURL(geoFile, self,
'nodesLoaded');
                    }"
                ]
            }
```

Appendix B

57

```
}
PROTO ASSubComponent [
        field SFInt32    count         0
        field SFString   name_seed     ""
        field SFNode     component     NULL
] { }

PROTO ASAttribute [
        field SFString name     ""
        field SFString type     ""
        field SFString value    ""
] { }

PROTO ASRule [
        field SFString source   ""
        field SFString target   ""
        field SFString type     ""
] { }

PROTO ASPart [
        exposedField   SFString    name                          ""
        exposedField   SFVec3f     translation         0 0 0
        exposedField   SFRotation  rotation            0 0 1 0
        exposedField   SFVec3f     scale               1 1 1
        exposedField   SFRotation  scaleOrientation    0 0 1 0
        exposedField   SFVec3f     center              0 0 0
        exposedField   MFNode      geometry            []
        exposedField   MFNode      children            []
]
{

Transform {
           translation       IS translation
           rotation          IS rotation
           scale             IS scale
           scaleOrientation  IS scaleOrientation
           center            IS center
           children [
              Group { children IS geometry }
              Group { children IS children }
           ]
        }
}
PROTO ASComponent [
        field    MFString geometry       []
        field    SFString name           ""
        field    SFString signature      ""
        field    SFString version        ""
        field    MFNode   subcomponents  []
        field    MFNode   behaviors      []
        field    MFNode   rules          []
        field    MFNode   attributes     []
```

Appendix B

```
            exposedField    SFVec3f      translation          0 0 0
            exposedField    SFRotation   rotation             0 0 1 0
            exposedField    SFVec3f      scale                1 1 1
            exposedField    SFRotation   scaleOrientation     0 0 1 0
  5         exposedField    SFVec3f      center               0 0 0
            exposedField    MFNode       children             []
        ]
        {
            DEF comp Transform {
 10             translation      IS    translation
                rotation         IS    rotation
                scale            IS    scale
                scaleOrientation IS    scaleOrientation
                center           IS    center
 15             children         IS    children
            }

ASGeometry {
            url    IS geometry
 20         node   USE comp
        }
    }

PROTO ASNavigationPath [
 25     exposedField MFNode   children []
    ]{}

PROTO ASAnimation [
 30     exposedField    SFString     description ""
        exposedField    MFNode       children     []
    ] {}

PROTO ASPartTransform [
 35     exposedField    SFString     name         ""
        exposedField    SFNode       posInterp    NULL
        exposedField    SFNode       orientInterp NULL
    ] {}
```

Appendix B

What is claimed is:

1. A software component that describes a virtual reality creature or object to be displayed on a visual display device of a computer system, said software component comprising a reference to a visual model and a reference to a behavior model, said visual model comprising at least one named part identified by a part name, said behavior model providing at least one behavioral action for said at least one named part, said at least one behavioral action identified by a behavior name, said behavior model configured to dynamically recognize said part name and dynamically reference and manipulate said named part by finding said part name at runtime.

2. The software component of claim 1, wherein said name is a logical name, said reference comprising a logical connection between said logical name and said behavior model.

3. The software component of claim 1, further comprising one or more named attributes.

4. The software component of claim 1, wherein said behavior model provides one or more behaviors.

5. The software component of claim 1, further comprising one or more additional references to one or more additional behavior models.

6. The software component of claim 1, wherein said software component is written in a VRML-like syntax.

7. The software component of claim 1, wherein said at least one named part is an element of a hierarchical structure of parts.

8. The software component of claim 1, wherein said behavior model is configured to describe rule-based relationships between a plurality of behavioral actions, said behavior model configured to identify said parts required for said behavioral actions to be applied in a valid manner.

9. A method for describing a virtual reality component, comprising the acts of:

specifying a visual model, said visual model including at least one named part, said at least one named part having a part definition, said part definition including a part name;

referencing a first behavior model, said first behavior model providing one or more actions that specify how said visual model acts in said virtual reality; and at runtime, dynamically associating at least one part dependency of said first behavior model to said at least one named part by finding said part name in a definition of said visual model.

10. The method of claim 9, further comprising the acts of:

referencing a second behavior model, said second behavior model providing one or more actions that specify how said visual model acts in said virtual reality;

associating one or more part dependencies of said second behavior model to one or more parts of said visual model; and specifying one or more rules that establish relationships between said first behavior model and said second behavior model for said virtual reality component.

11. A computer graphics system for creating a visual representation of a virtual environment, said system comprising:

a computer processor operatively coupled to a memory;

a visual display device operatively coupled to said computer processor;

one or more input devices operatively coupled to said computer processor;

a browser-type software module loaded into said memory, said browser-type software module responsive to inputs from said input devices, said browser-type software module configured to:

load a description of a virtual world;

load one or more software components from a component library, said software components referenced by said description of said virtual world, each of said software components comprising a visual model and a reference to a behavior model, said visual model comprising at least one named part, said behavior model configured to recognize said named part at runtime and to dynamically connect to said named part at runtime;

load behavior models referenced by said software components;

load a description of a view into said virtual world;

use said description of a view to generate a user interface into said virtual world on said computer display device, said view including a visual representation of said virtual world and user interface elements for interaction with users and said input devices for controlling and interacting with said virtual world;

manipulate said software components in response to inputs from said input devices; and use said behavior models to provide interactions between at least two of said software components inhabiting said virtual world.

12. The computer graphic system of claim 11, wherein said browser-type software module is an enhanced VRML browser.

13. The modular graphic system of claim 11, further comprising a database for storing said visual models.

14. The modular graphic system of claim 11, further comprising a database for storing said components.

15. The modular graphic system of claim 11, further comprising a database for storing said behaviors.

16. The modular graphics system of claim 11, wherein said view comprises scripts for controlling said referenced components.

17. The modular graphics system of claim 11, wherein said view maps I/O actions into events.

18. The modular graphics system of claim 11, wherein said visual model comprises a plurality of parts organized in a hierarchical structure.

19. The modular graphics system of claim 18, wherein different behaviors map to different parts in said hierarchical structure such that behaviors mapped to higher-level parts in said hierarchical structure affect the behavior of lower-level parts.

20. The modular graphics system of claim 19, wherein a mapping of a behavior to a first part in a first level of the hierarchical structure affects the behavior of said first part and all parts subordinate to said first part in said hierarchical structure but does not affect the behavior of parts not subordinate to said first part.

* * * * *